United States Patent
Gilboa et al.

(10) Patent No.: US 8,407,610 B2
(45) Date of Patent: Mar. 26, 2013

(54) EXECUTABLE AND DECLARATIVE SPECIFICATION FOR GRAPHICAL USER INTERFACES

(75) Inventors: Yuval Gilboa, Pardesiya (IL); Rinat Gilboa, Pardesiya (IL)

(73) Assignee: SAP Portals Israel Ltd., Ra'Anana (IL)

( * ) Notice: Subject to any disclaimer, the term of this patent is extended or adjusted under 35 U.S.C. 154(b) by 1872 days.

(21) Appl. No.: 11/324,155

(22) Filed: Dec. 29, 2005

(65) Prior Publication Data
US 2007/0094609 A1   Apr. 26, 2007

Related U.S. Application Data

(60) Provisional application No. 60/722,888, filed on Sep. 30, 2005.

(51) Int. Cl.
G06F 3/00 (2006.01)
G06F 3/01 (2006.01)
(52) U.S. Cl. ............... 715/762; 715/761; 715/763
(58) Field of Classification Search ........... 715/761–763
See application file for complete search history.

(56) References Cited

U.S. PATENT DOCUMENTS
6,342,907 B1   1/2002 Petty et al.
2004/0148586 A1   7/2004 Gilboa

FOREIGN PATENT DOCUMENTS
EP   1770510 A2   4/2007

OTHER PUBLICATIONS

Learning Java, Copyright © 2000 O'Reilly & Associates, Inc. All rights reserved. Printed in the United States of America. Published by O'Reilly & Associates, Inc., 101 Morris Street, Sebastopol, CA 95472.*
The Forms Working Group, Copyright 1999-2007, printed on Apr. 5, 2007 from http://www.w3.org/MarkUP/Forms/.
XForms 1.0, W3C Recommendation Oct. 14, 2003, printed on Apr. 5, 2007 from http://www.w3.org/TR/2003/REC-xforms-20031014/.
XForms 1.0 Basic Profile, W3C Candidate Recommendation Oct. 14, 2003, printed on Apr. 5, 2007 from http://www.w3.org/TR/2003/CR-xforms-basic-20031014/.
XForms 1.0 (Second Edition) W3C Recommendation Mar. 14, 2006, printed on Apr. 5, 2007 from http://www.w3.org/TR/2006/REC-xforms-20060314/.
XForms 1.0 Frequently Asked Questions, W3C Forms Working Group, printed on Apr. 5, 2007 from http://www.w3.org/MarkUp/Forms/2006/xforms-faq.html.
XForms Quick Reference, Steven Pemberton, W3C/CWI, Version date: Mar. 23, 2006, printed on Apr. 5, 2007 from http://www.w3.org/MarkUp/Forms/2006/xforms-qr.html.
XForms 1.1, W3C Working Draft, Feb. 22, 2007, printed April on 6, 2007 from http://www.w3.org/TR/2007/WD-xforms11-20070222.

(Continued)

*Primary Examiner* — Ramsey Refai
*Assistant Examiner* — Andres E Gutierrez
(74) *Attorney, Agent, or Firm* — Buckley, Maschoff & Talwalkar LLC

(57) ABSTRACT

Techniques for decoupling models created during design-time from the runtime environment. A declarative and executable representation for GUIs for applications is provided that is independent of any particular runtime platform, GUI framework, device, or programming language and which acts as an interface between the design environment and the runtime environment.

19 Claims, 16 Drawing Sheets

OTHER PUBLICATIONS

Jean Vanderdoncki et al., "A MDA-Compliant Environment for Developing User Interfaces of Information Systems", Advanced Information Systems Engineering [Lecture Notes in Computer Science; LNCS], Springer-Verlag, Berlin/ Heidelberg, vol. 3520, May 17, 2005, XP019009928, ISBN: 978-3-540-26095-0, pp. 16-31, 16 pages total.

Quentin Limbourg et al., "USIXML: A Language Supporting Multi-path Development of User Interfaces", Engineering Human Computer Interaction and Interactive Systems; [Lecture Notes in Computer Science; LNCS], Springer-Verlag, Berlin/Heidelberg, Jun. 30, 2005, XP019009959, ISBN: 978-3-540-26097-4, pp. 200-220, 21 pages total.

Mir Farooq Ali et al., "Building Multi-Platform User Interfaces with UIML", Internet Citation, [Online], XP002280476, Retrieved from the Internet: URL:http://arxiv.org/ftp/cs/papers/0111/0111024.pdf> [retrieved on May 17, 2004], 11pgs.

Bernhard Humm et al., "Model-Driven Development—Hot Spots in Business Information Systems", Model Driven Architecture—Foundations and Applications Lecture Notes in Computer Science; LNCS, Springer, Berlin, DE, vol. 3748, Jan. 1, 2005, XP0192023949, ISBN: 978-3-540-30026-7, pp. 103-114, 12 pages total.

Dr. Martin Kempt et al., "Model Driven Architecture", Informatik-Spektrum; Organ Der Gesellschaft Fur Informatik E.V. Und Mit IHR Assoziierter Organisationen, Springer, Berlin, DE, vol. 28, No. 4, Aug. 1, 2005, XP019334585, ISSN: 1432-122X, pp. 298-302, 5 pages total.

"Communication: Extended European Search Report", dated Dec. 30, 2008, European Patent Office, for European Application No. 06020331.2-2211/1770510, 15pgs.

\* cited by examiner

EXAMPLE #1: BANKING APPLICATION GUI (FOR JAVA RUNTIME PLATFORM)

Search Form

[Search] [Clear]

[] Bank City * [US]
[] Max Rows * [10]

[Submit]

Banks List

[Add] [Delete]

| | Bank City | Bank Key | Bank Name | City |
|---|---|---|---|---|
| ☐ | US | 083000108 | First Union Bank & Trust | Chicago |
| ☐ | US | 123123123 | Citibank | New York |
| ☑ | US | 123445678 | Chase Manhattan Bank | New York City |
| ☐ | US | 12345678 | Commerce Bank | Philadelphia |
| ☐ | US | 123456780 | PNC | Marlton |
| ☐ | US | 123456784 | Chase Manahattan | New York |
| ☐ | US | 123456788 | Mellon Bank | Philadelphia |
| ☐ | US | 123456789 | Fidelity Bank | Los Angeles |

Page 1/2

Bank Address

[] Pobk Curac
[] Bank No [123445678]
[] Addr No
[] Bank Branch [Main Branch]
[] Bank Group
[] Bank Name [Chase Manhattan Bank]
[] City [New York City]
[] Region [NY]
[] Street [Main Street]
[] Swift Code [ABCD3891]
[] Post Bank

Bank Details

[] Bank City [US]   [] Bank Key [123445678]   [] Bank Name [Chase Manhattan Bank]   [] City [New York City]

*FIG. 4C*

EXAMPLE #1: BANKING APPLICATION GUI (FOR FLASH RUNTIME PLATFORM)

Banks Search

Search Form

Bank Ctry: US *
Max Rows: 200 *
[Search] [Clear] [Submit]

Banks List

| Bank Ctry | Bank Key | Bank Name | City |
|---|---|---|---|
| US | 083000108 | First Union Bank & Trust | Chicago |
| US | 123123123 | Citibank | New York |
| US | 123445678 | Chase Manhattan Bank | New York City |
| US | 12345678 | Commerce Bank | Philadelphia |
| US | 123456780 | PNC | Marlton |
| US | 123456784 | Chase Manahattan | New York |
| US | 123456788 | Mellon Bank | Philadelphia |
| US | 123456789 | Fidelity Bank | Los Angeles |
| US | 13000609 | Bank of Houston | Houston |
| US | 130006093 | PNC | Chicago |

[Add] [Delete]

Bank Details

Bank Ctry: US
Bank Key: 123445678
Bank Name: Chase Manhattan Ba
City: New York city

Bank Address

Pobk Curac:
Bank No: 123445678
Addr No:
Bank Branch: Main Branch
Bank Group:
Bank Name: Chase Manhattan Ba
City: New York City
Region: NY
Street: Main Street
Swift Code: ABCD3891
Post Bank:

*FIG. 4D*

EXAMPLE #1: BANKING APPLICATION GUI (FOR DHTML RUNTIME PLATFORM)

Search Form

[Search] [Clear]

| Bank Ctry: | US |
| Max Rows: | 10 |

[Submit]

Bank Address

| Pobk Curac: | |
| Bank No: | 123445678 |
| Addr No: | |
| Bank Branch: | Main Branch |
| Bank Group: | |
| Bank Name: | Chase Manhattan Ba |
| City: | New York City |
| Region: | NY |
| Street: | Main Street |
| Swift Code: | ABCD3891 |
| Post Bank: | |

Banks List

[Add] [Delete]

| BANK_CTRY ▲▼ | BANK_KEY ▲▼ | BANK_NAME ▲▼ | CITY ▲▼ |
|---|---|---|---|
| US | 083000108 | First Union Bank & Trust | Chicago |
| US | 123123123 | Citibank | New York |
| US | 123445678 | Chase Manhattan Bank | New York City |
| US | 12345678 | Commerce Bank | Philadelphia |
| US | 123456780 | PNC | Marlton |
| US | 123456784 | Chase Manahattan | New York |
| US | 123456788 | Mellon Bank | Philadelphia |
| US | 123456789 | Fidelity Bank | Los Angeles |

|◀ ◀ ▶ ▶| 1/2

Bank Details

| Bank Ctry: | US | Bank Key: | 123445678 | Bank Name: | Chase Manhattan Ba | City: | New York City |

*FIG. 4E*

```
<?xml version="1.0"?>
<xg:Component urn namespace-decl_many >
    <xg:Window ...>
        container-decl_nested
            interactor-decl_many
                control-decl_many
    </xg:Window>

<xg:Data>
        infosets-section
        infoactors-section
        operators-section
        enumerations-section
    </xg:Data>

<xg:Controller>
        actions-section
        relays-section
        execution-plans-section
    </xg:Controller>

<xg:Resources>
        images-section
        palettes-section
        translations-section
        systems-section
        imports-section
    </xg:Resources>
</xg:Component>
```

*FIG. 6*

```xml
<?xml version="1.0"?>
<xg:Component urn="AAD6BU" xmlns:xg="http://www.sap.com/visualcomposer/2005/xgl"
    xmlns:ep="http://www.sap.com/visualcomposer/2005/xgl/portal">
    <xg:Window windowTitle="Wizard1" windowType="top" preferredWidth="760"
        preferredHeight="480" frameStyle="primary">
        <xg:Canvas enableScrolling="true" scaleMode="fix">
            <xg:Wizard defaultChild="ABA6BV" roadmapStyle="full" frameStyle="none">
            <xg:Panel frameStyle="primary" w="320" h="160" x="344" y="16"
                showTitlebar="true">
                <xg:FormView id="ACA6CL" infoset="AAA6CL" title="Form5" scaleMode="fix"
                    formLayout="absolute" formWidth="184" formHeight="64" isEditable="true">
                    <xg:Controls>
                </xg:FormView>
            </xg:Panel>
        </xg:Canvas>
    </xg:Window>
    <xg:Data>
        <xg:Infosets>
        <xg:Infoactors>
        - <xg:Operators/>
        <xg:Enumerations>
    </xg:Data>
    <xg:Controller>
        <xg:Actions>
        - <xg:Relays/>
        <xg:ExecutionPlans>
    </xg:Controller>
    <xg:Resources>
        - <xg:Images/>
        - <xg:Palettes/>
        - <xg:Translations/>
        <xg:Systems>
        - <xg:Imports/>
    </xg:Resources>
</xg:Component>
```

EXECUTABLE AND DECLARATIVE SPECIFICATION FOR GRAPHICAL USER INTERFACES

CROSS-REFERENCES TO RELATED APPLICATIONS

The present application is a non-provisional application claiming benefit under 35 U.S.C. 119(e) of U.S. Provisional Patent Application No. 60/722,888 titled EXECUTABLE SPECIFICATION OF GRAPHICAL USER INTERFACES (XGL) filed Sep. 30, 2005, the entire contents (including all the appendices) of which are herein incorporated by reference for all purposes.

BACKGROUND OF THE INVENTION

The present invention relates to graphical user interfaces, and more particularly to techniques for facilitating creation of graphical user interfaces for different runtime environments.

In the computing domain, information is commonly stored in the form of models. For example, during the design phase, a designer may use a modeling tool to design an application. As part of the application design, the modeling tool may generate a model representation that stores information for the application including information about graphical user interfaces (GUIs) associated with the application. The model may store information related to various entities or components of the application, information describing inputs or outputs of the components, information describing dependencies between the various components and their input and outputs, a component's response to signals, the runtime environment, and other information for the application. The model that is used for storing application information may be configured by the designer after taking into consideration various factors such as the domain in which the application is to be used, the memory resources available for storing the information, the computing resources available for processing the model, tools to be used for manipulating the model, and other factors. A model representation (also referred to as canonic model representation) thus provides a convenient way to persist information for an application in a machine-readable representation. Various different types of model representations may be used. The type of model that is used may depend upon the domain in which the application is to be used, the design-time modeling environment used by the designer, available computing and memory resources, and the like.

During runtime, a design-time model (i.e., a model generated during design-time) is typically transformed to a form that can then be executed by a target device. The transformation from a model representation to an executable form is usually performed by a runtime framework which may comprise tools such as source code generators, compilers, interpreters, etc. This transformation generally depends on the characteristics of the runtime environment such as the runtime platform of the target device on which the application is to run (e.g., the target device that is used to output or display the GUI), characteristics of the target device such as GUI capabilities of the target device, and other factors that are specific to the runtime environment.

Conventionally, transformations from a design-time model representation to a runtime form are performed by specialized runtime tools (e.g., compilers), each tool programmed to convert a particular type of model to a particular target device-specific and runtime environment-specific executable form. The model representation is thus tightly coupled to the runtime environment. Due to this tight coupling, many times, it becomes very difficult to evolve model representations without affecting the runtime environment and the designer is forced to take into consideration runtime environment dependencies during the design phase.

BRIEF SUMMARY OF THE INVENTION

Embodiments of the present invention provide techniques for decoupling models created during design-time from the runtime environment. A declarative and executable representation for GUIs for applications is provided that is independent of any particular runtime platform, GUI framework, device, and programming language.

According to an embodiment of the present invention, techniques are provided for generating an abstract representation for a model representation. Information is received identifying a model representation for an application, the model representation comprising information describing a graphical user interface (GUI) for the application. An abstract representation is generated for the GUI based upon the model representation, wherein the abstract representation is independent of a runtime environment platform for executing the application.

According to an embodiment of the present invention, a first GUI for a first runtime environment platform using the abstract representation. In one embodiment, the first GUI is generated by generating first source code based upon the abstract representation, wherein the first source code is in a language supported by the first runtime environment platform, and executing the first source code using the first runtime environment platform to generate the first GUI. According to another embodiment, the first GUI is generated by generating machine executable statements specific to the first runtime environment platform based upon the abstract representation, and executing the machine executable statements using the first runtime environment platform to generate the first GUI. The first runtime environment platform may be a Java platform, a Flash platform, Extensible Application Markup Language (XAML) platform, a dynamic HTML (DHTML) platform, or some other platform.

According to an embodiment of the present invention, a second GUI is generated for a second runtime environment platform using the abstract representation, wherein the second runtime environment platform is different from the first runtime environment platform.

In one embodiment, generating the abstract representation comprises using a first set of mapping rules for generating the abstract representation from the model representation, generating the first GUI comprises using a second set of mapping rules for generating the first GUI from the abstract representation, and generating the second GUI comprises using a third set of mapping rules for generating the second GUI from the abstract representation.

According to an embodiment of the present invention, the abstract representation is not dependent on a GUI-framework of the runtime environment platform. According to another embodiment of the present invention, the abstract representation is not dependent on a language of the runtime environment platform.

According to an embodiment of the present invention, techniques are provided for generating an abstract representation for a model representation. Information is received identifying a model representation for an application, the model representation comprising information describing a graphical user interface (GUI) for the application. An abstract representation is generated for the GUI based upon the model representation, wherein the abstract representation is declarative and executable.

According to an embodiment of the present invention, a generic, declarative, and executable GUI language (XGL) is defined that is independent of any GUI framework or runtime platform, not dependent on characteristics of a target device on which the graphic user interface is to be displayed, and is also independent of any programming language. XGL is used to generate a generic representation (XGL representation) for a design-time model representation. The XGL representation is declarative and therefore does not depend on any GUI framework, runtime platform, or device, or programming language. An XGL representation is thus a device-independent representation of a GUI. The XGL representation is executable implying that for a model representation unambiguously encapsulates execution semantics for the GUI described by the model representation. The XGL representation that is created from a model representation may then be processed in the runtime environment. The XGL representation may be used to generate device-specific and runtime environment-specific GUIs and runtime representations for various target devices and runtime platforms. An XGL representation thus serves as the common-ground or interface between design-time user interface modeling tools and a plurality of user interface runtime frameworks.

The foregoing, together with other features, embodiments, and advantages of the present invention, will become more apparent when referring to the following specification, claims, and accompanying drawings.

BRIEF DESCRIPTION OF THE DRAWINGS

FIG. 4C depicts a screenshot generated GUI for a Java platform using an XGL representation generated for Example #1 according to an embodiment of the present invention;

FIG. 4D depicts a screenshot generated GUI for a Flash platform using an XGL representation generated for Example #1 according to an embodiment of the present invention;

FIG. 4E depicts a screenshot generated GUI for a DHTML platform using an XGL representation generated for Example #1 according to an embodiment of the present invention;

FIG. 6 depicts a sample XGL component declaration structure according to an embodiment of the present invention;

FIG. 7 depicts a sample listing showing the skeleton of a sample XGL component according to an embodiment of the present invention.

DETAILED DESCRIPTION OF THE INVENTION

Figure 1:
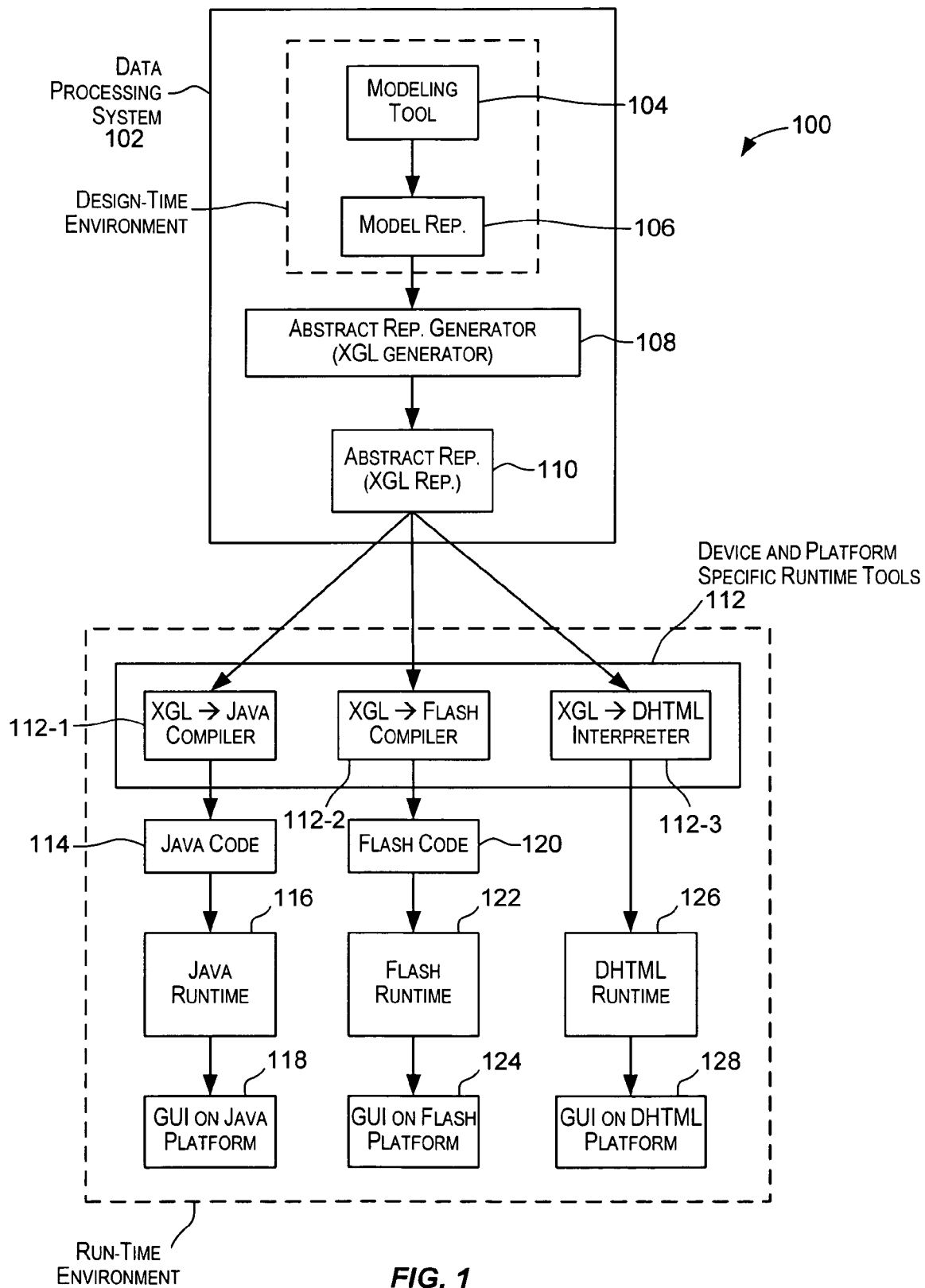
FIG. 1 depicts a simplified environment in which an embodiment of the present invention may be used.

In the following description, for the purposes of explanation, specific details are set forth in order to provide a thorough understanding of the invention. However, it will be apparent that the invention may be practiced without these specific details.

Embodiments of the present invention provide techniques for decoupling models created during design-time from the runtime environment. Model representations for GUIs created in a design time environment are decoupled from the runtime environment in which the GUIs are executed. A declarative and executable representation for GUIs for applications is provided that is independent of any particular runtime platform, GUI framework, device, or programming language.

According to an embodiment of the present invention, a generic, declarative, and executable GUI language (XGL) is provided. XGL is independent of any particular GUI framework or runtime platform. XGL is also not dependent on characteristics of a target device on which the graphic user interface is to be displayed. XGL is also independent of any programming language. XGL is used to generate a generic representation (referred to as the XGL representation or XGL-compliant representation) for a design-time model representation. The XGL representation is declarative which implies that the representation does not depend on any GUI framework, runtime platform, or device, or programming language. An XGL representation is thus a device-independent representation of a GUI. The XGL representation is executable and therefore unambiguously encapsulates execution semantics for the GUI described by a model representation. Models of different types can be transformed to XGL representations.

An XGL representation that is created from a model representation may then be used for processing in the runtime environment. For example, the XGL representation may be used to generate a machine-executable runtime GUI (or some other runtime representation) that may be executed by a target device. As part of the runtime processing, an XGL representation may be transformed into one or more runtime representations (e.g., source code in a particular programming language, machine-executable code for a specific runtime environment, executable GUI, etc.) that may be generated for specific runtime environments and devices. Since the XGL representation, rather than the design-time model representation, is used by the runtime environment, the design-time model representation is decoupled from the runtime environment. An XGL representation thus serves as the common-ground or interface between design-time user interface modeling tools and a plurality of user interface runtime frameworks. It provides a self-contained, closed, and deterministic definition of all aspects of a graphical user interface in a device-independent and programming-language independent manner. In an embodiment, the XGL semantics may be rigorously defined using an abstract model of a GUI framework. A specific embodiment of XGL is described below under the section titled "SAMPLE XGL SPECIFICATION (example embodiment)".

In the runtime environment, various different GUI framework-specific and platform-specific tools (e.g., code generators, interpreters, compilers, etc.) may be used to transform an XGL representation into GUIs running on target devices. These tools may comply with XGL specification. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

XGL may be used for generating representations of various different GUIs and supports various GUI features including full windowing and componentization support, rich data visualizations and animations, rich modes of data entry and user interactions, and flexible connectivity to any complex application data services. XGL is fully declarative and therefore does not rely on any particular programming language.

FIG. 1 depicts a simplified environment 100 in which an embodiment of the present invention may be used. As depicted in FIG. 1, a modeling tool 104 running on a data processing system 102 may be used by a GUI designer during the application design phase to create a model representation 106 for a GUI application. Model representation 106 may be a machine-readable representation of an application or a domain specific model. Model representation 106 may encapsulate various design parameters related to the GUI such as GUI components, dependencies between the GUI components, inputs and outputs, and the like. Model representation 106 provides a form in which a model(s) is persisted and transported, and possibly handled by various tools such as code generators, runtime interpreters, analysis and validation tools, merge tools, and the like. In one embodiment, model representation 106 may be a collection of XML documents with a well-formed syntax. Various different modeling tools 104 may be used to generate model representation 106. These tools include but are not restricted to Visual Composer™ provided by SAP AG of Germany, Rational Rose™, Borland Together™, Microsoft ViSio™, and others. Modeling tool 104 and model representation 106 may be considered to be part of a design time environment.

According to an embodiment of the present invention, an abstract representation generator (or XGL generator) 108 is provided that generates an abstract representation (XGL representation or XGL-compliant representation) 110 based upon model representation 106. Abstract representation generator 108 takes model representation 106 as input and outputs abstract representation 110 for the model representation. A specific embodiment of XGL is described below. Various other types of XGLs may also be used in alternative embodiments.

Model representation 106 may be of various forms or types depending on the tool/language used for the modeling. These various different model representations may be mapped to XGL representation 110. Different mapping rules may be provided for mapping a model representation to an XGL representation. Different types of model representations may be transformed or mapped to XGL representations. For each type of model representation, mapping rules may be provided for mapping the model representation to an XGL representation.

As previously indicated, XGL is independent of any GUI framework or runtime platform and is also independent of any programming language or target device characteristic. Further, XGL is capable of unambiguously encapsulating execution semantics for the GUI model representation. Accordingly, XGL representation 110 generated for a model representation 106 is declarative and executable—XGL representation 110 thus provides a representation of the GUI of model 106 that is not dependent on any device or runtime platform, is not dependent on any programming language, and unambiguously encapsulates execution semantics for the GUI. The execution semantics may include for example, identification of various components of the GUI, interpretation of connections between the various GUI components, information identifying the order of sequencing of events, rules governing dynamic behavior of the GUI, rules governing handling of values by the GUI, and the like. The XGL representation is also not GUI runtime-platform specific. The XGL representation provides a self-contained, closed, and deterministic definition of all aspects of a graphical user interface that is device independent and language independent. XGL generator 108 may be configured to generate XGL representations for models of different types, which may be created using different modeling tools 104.

XGL or abstract representation 110 provides an interface between the design time environment and the runtime environment. As depicted in FIG. 1, abstract representation 110 may be used by runtime processing. As part of runtime processing, various runtime tools 112 may generate different types of runtime representations based upon abstract representation 110. Examples of runtime representations include device or language dependent source code, runtime platform-specific machine-readable code, GUIs for a particular target device, and the like. Runtime tools may include compilers, interpreters, source code generators, and other such tools that are configured to generate runtime platform-specific or target device-specific runtime representations of abstract representation 110.

A runtime tool may generate a runtime representation from XGL representation 110 using specific rules that map abstract representation 110 to a particular type of runtime representation generated by the tool. These mapping rules may be dependent on the type of runtime tool, characteristics of the target device to be used for displaying the GUI, runtime platform, and/or other factors. Accordingly, mapping rules may be provided for transforming an XGL representation to any number of target runtime representation directed to one or more target GUI runtime platforms.

For example, as depicted in FIG. 1, an XGL-to-Java compiler 112-1 may take XGL representation 110 as input and generate Java code 114 for execution by a target device comprising a Java runtime 116. Java runtime 116 may execute Java code 116 to generate/display a GUI 118 on a Java-platform target device. As another example, an XGL-to-Flash compiler 112-2 may take XGL representation 110 as input and generate Flash code 120 for execution by a target device comprising a Flash runtime 122. Flash runtime 122 may execute Flash code 120 to generate/display a GUI 124 on a target device comprising a Flash platform. As another example, an XGL-to-DHTML (dynamic HTML) interpreter 112-3 may take XGL representation 110 as input and generate DHTML statements (instructions) on the fly which are then interpreted by a DHTML runtime 126 to generate/display a GUI 128 on a target device comprising DHTML platform.

It should be apparent that abstract XGL representation 110 may be used to generate GUIs for various other runtime platforms (e.g., Extensible Application Markup Language (XAML), etc.) and devices. The same model representation 110 may be mapped to various runtime representations and device-specific and runtime platform-specific GUIs. In general, in the runtime environment, machine executable instructions specific to a runtime environment may be generated based upon XGL representation 110 and executed to generate a GUI in the runtime environment. The same XGL representation may be used to generate machine executable instructions specific to different runtime environments and target devices.

Since the runtime environment uses XGL representation 110 rather than model representation 106 for runtime processing, the model representation that is created during design-time is decoupled from the runtime environment. XGL representation 110 thus provides an interface between the design environment and the runtime environment. As a result, changes may be made to the design time environment, including changes to model representation 110 or changes that affect model representation 110, without affecting or impacting the runtime environment or tools used by the runtime environment. Likewise, changes may be made to the runtime environment without affecting or impacting the design time environment. A designer can thus concentrate on the design aspects and make changes to the design without having to worry about the runtime dependencies such as the target device platform or programming language dependencies. The XGL representation provides the interface by which the design time environment communicates with the runtime environment. An XGL representation thus serves as the common-ground between user interface modeling tools and a plurality of user interface runtime frameworks.

XGL representation 110 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs)., the GUI generated by the devices are consistent with each other in their appearance and behavior.

Embodiments of the present invention provide a generic process that enables transforming any model representation (created using possibly different modeling languages) to an abstract representation that is device independent, language independent, and encompasses execution semantics. Further, the same abstract representation may be used in different runtime environments. In this manner, due to the XGL representation, the generation of a GUI for a particular device is not tied down to any specific modeling representation type (e.g., not tied to any particular modeling domain format or language) and the design of the GUI is not tied to any runtime environment or platform or language.

According to an embodiment of the present invention, the process of mapping a model representation 106 to an abstract representation 110 and mapping an abstract representation 110 to some runtime representation may be automated. For example, a tool such as Visual Composer™ from SAP may provide design tools that automatically generate an abstract representation for a model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Figure 2:
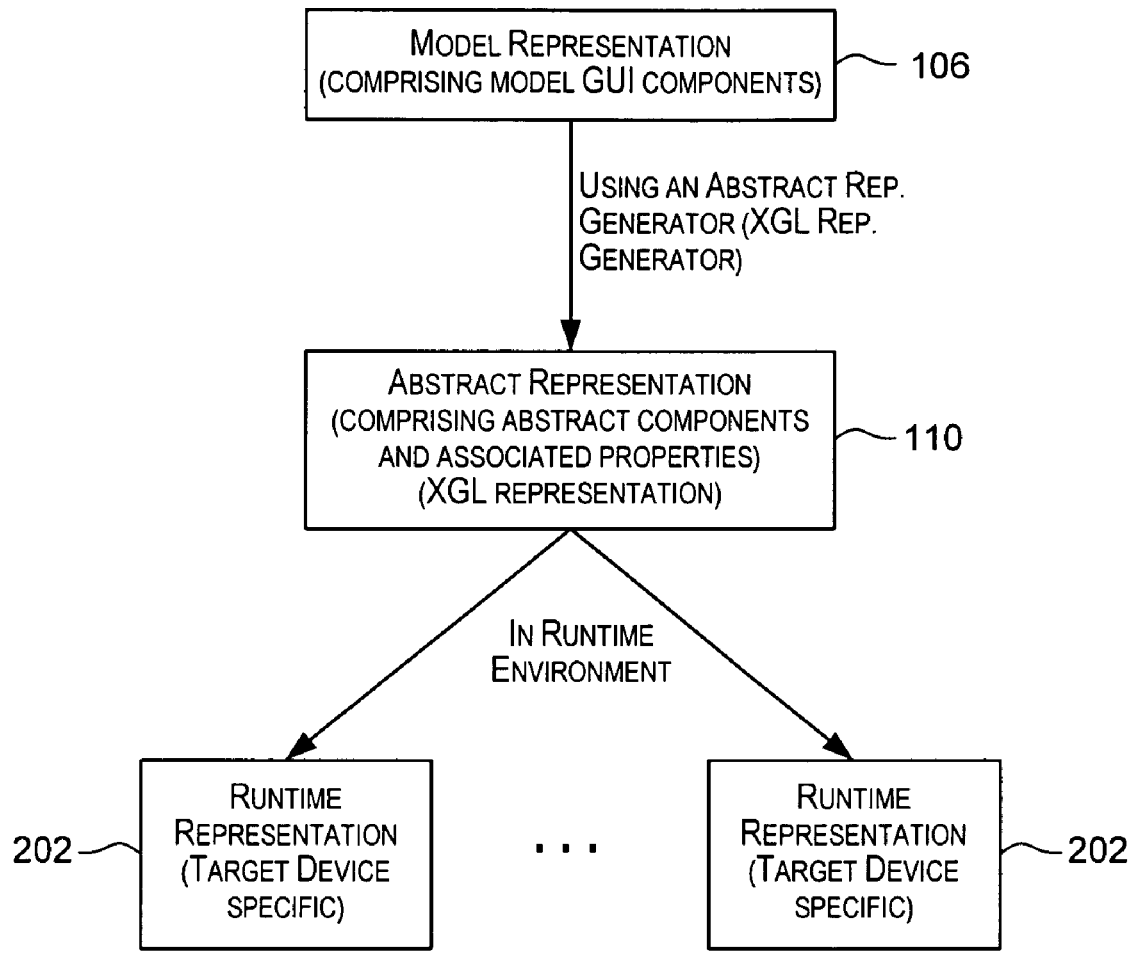
FIG. 2 depicts a simplified process for mapping a model representation to a runtime representation according to an embodiment of the present invention.

FIG. 2 depicts a simplified process for mapping a model representation to a runtime representation according to an embodiment of the present invention. Model representation 106 may comprise one or more model GUI components and associated properties that describe a GUI. An abstract representation 110 is generated based upon model representation 106. Abstract representation 110 may be generated by an abstract representation generator (e.g., a XGL generator). Abstract representation 110 (e.g., XGL representation) comprises one or more abstract GUI components (e.g., XGL components) and properties associated with the abstract GUI components. As part of generation of abstract representation 110, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI such as in response to events (e.g., clicking, dragging, scrolling, etc.), interactions between GUI components, etc.

One or more runtime representations 202 including GUIs for specific runtime environment platform may be generated from abstract representation 110. A device-dependent runtime representation may be generated for a particular type of target device platform to be used for executing and displaying the GUI encapsulated by the abstract representation. The GUIs generated from abstract representation 110 may comprise various types of GUI elements such as buttons, windows, scrollbars, inputs boxes, etc. Rules may be provided for mapping an abstract representation to a particular runtime representation. Various mapping rules may be provided for different runtime environment platforms.

Figure 3:
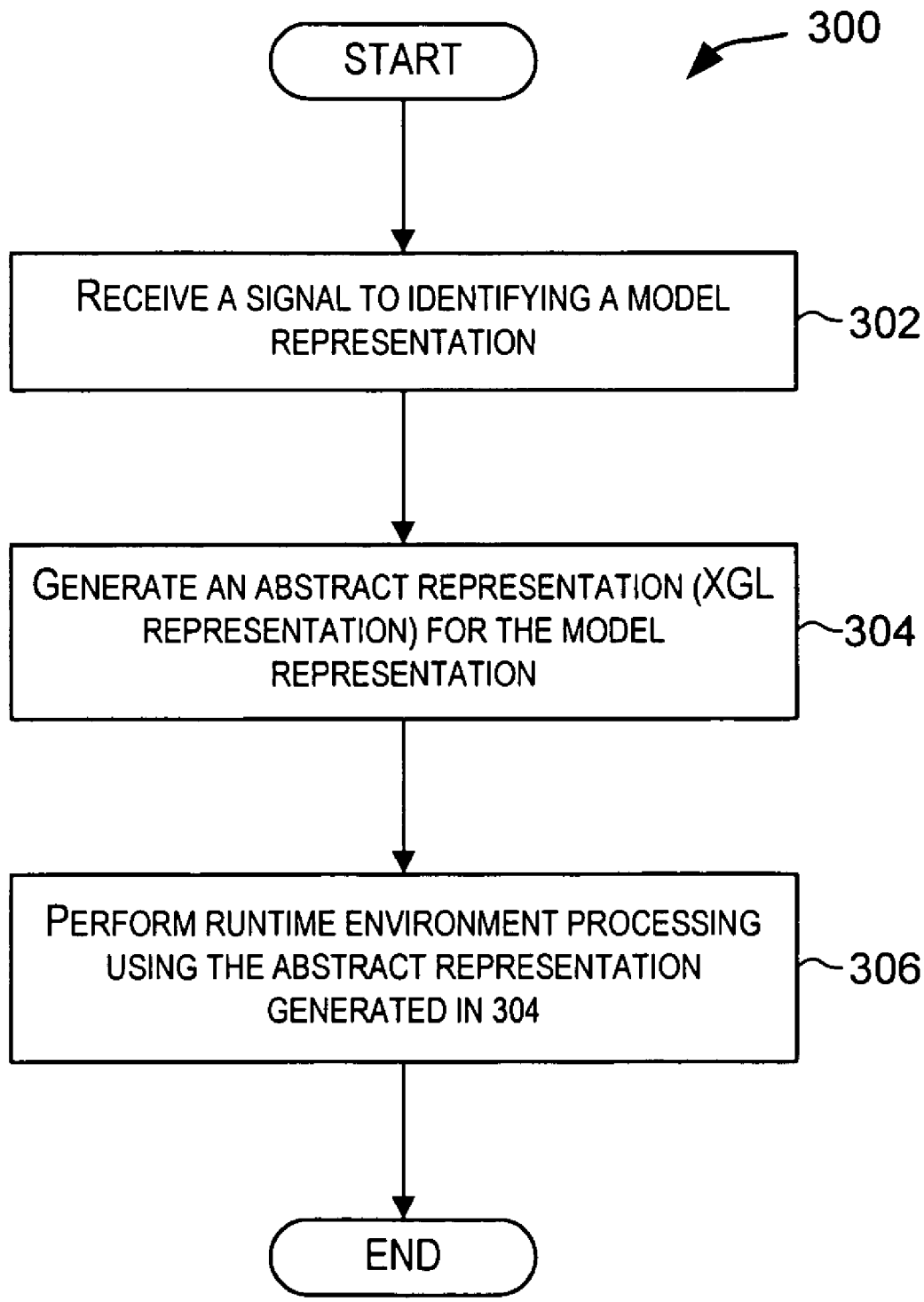
FIG. 3 depicts a simplified high-level flowchart showing processing performed according to an embodiment of the present invention.

FIG. 3 depicts a simplified high-level flowchart 300 showing processing performed according to an embodiment of the present invention. The processing depicted in FIG. 3 or a portion thereof may be performed by software (code modules or instructions) executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

As depicted in FIG. 3, processing may be initiated upon receiving a signal identifying a model representation (step 302). The signal may be generated for example when a user using a tool, such as Visual Composer™ provided by SAP, selects a particular model and requests that a runtime representation be generated for the model representation. The signal may also be generated and received in response to various other actions or events. The signal may be received in various contexts.

An abstract representation is then generated for the model representation identified in step 302 (step 304). In one embodiment, an XGL representation is generated for the model representation. Mapping rules that map model GUI components to abstract GUI components and their associated properties may be used to generate the abstract XGL representation. An XGL generator may be used to generate the XGL representation.

The XGL representation may then be used for processing performed in the runtime environment (step 306). As part of 306, one or more runtime tools may generate one or more runtime environment platform-specific representations based upon the abstract representation generated in 304. For example, a runtime representation may be created for a particular device or for a particular runtime programming language environment. For example, for a target device supporting a runtime Java environment, a XGL-to-Java compiler may be used to generate Java code based upon the abstract representation. The generated Java code may then be executed by the Java runtime to display a GUI on the target device. For a device supporting a runtime Flash environment, a XGL-to-Flash compiler may be used to generate Flash code based upon the abstract representation. The generated Flash code may then be executed by the Flash runtime to display a GUI on the target device. For a device supporting a runtime DHTML (dynamic HTML) environment, a XGL-to-DHTML interpreter may on-the-fly generate a GUI (e.g., a screenshot) running DHTML. Various other runtime representations and for other runtime platforms may also be generated. Customized runtime tools may be developed to facilitate generation of runtime representations and GUIs for different GUI platforms. In some embodiments, the same device may support different runtime environment platforms and different runtime representations and GUIs may be generated for the different platforms for the same device. One or more runtime tools (e.g., compilers, interpreters, source coded generators, etc.) may be used in the runtime environment. Rules may be provided for mapping an XGL representation to a runtime representation for a particular runtime platform.

The GUIs that are generated in 306 may be output using different types of output devices. For example, the GUI may be displayed to a user on an output device such as a monitor. An XGL-compliant abstract representation ensures that the appearance and behavior of the generated user interfaces is preserved across a plurality of target GUI frameworks, while accommodating the differences in the intrinsic characteristics of each target device and also accommodating the different levels of capability of target devices. The GUIs or runtime representations may also be provided to other applications for further processing.

In one embodiment, the processing depicted in FIG. 3 and the features of embodiments of the present invention are incorporated in the Visual Composer™ tool provided by SAP. In Visual Composer™, the design-time model is transformed into an XGL representation which is then used as input to the runtime code generation phase. All code generators/interpreters in Visual Composer™ take an XGL representation as input and generate the user interface runtime for their specific platforms. These platforms include for example Java platform, Flash platform, DHTML platform, XAML framework, etc. Various other tools may also enable processing according to the teachings of the present invention.

EXAMPLES

This section describes two examples depicting the process of generating an abstract representation for a model representation and using the abstract representation to generate GUIs for different runtime platforms. These examples are however not intended to limit the scope of the present invention as recited in the claims.

Example #1

Figure 4A:
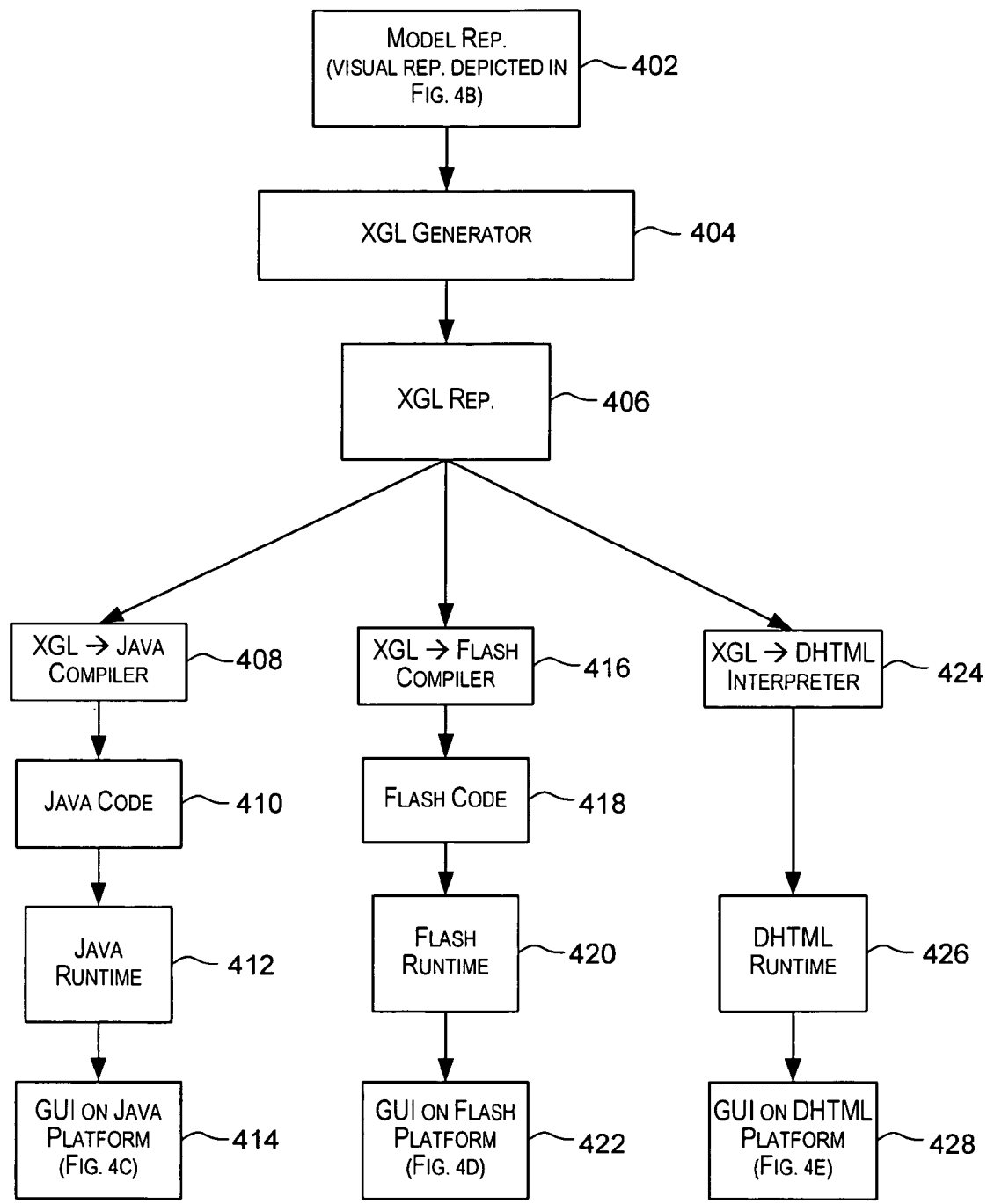
FIG. 4A depicts a processing flow applicable to Example #1 according to an embodiment of the present invention.
Figure 4B:
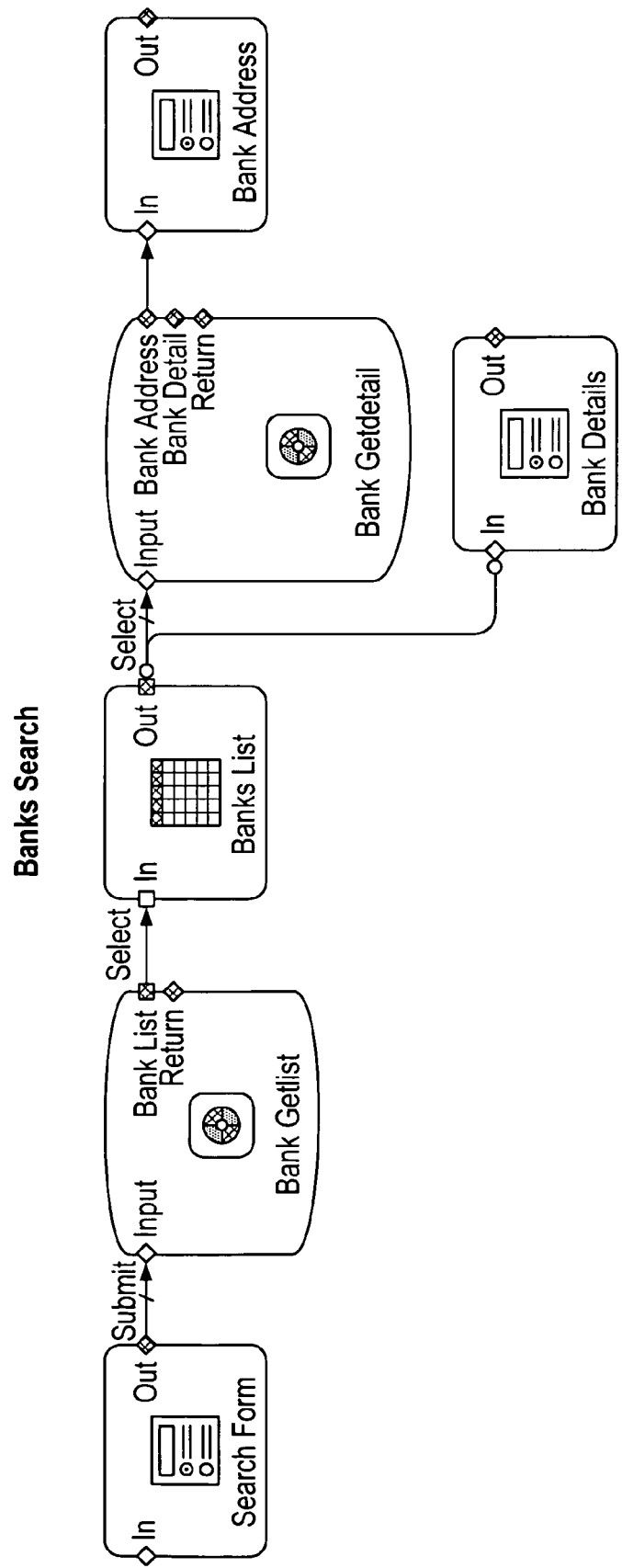
FIG. 4B depicts a visual representation of a model representation for a bank data-entry application GUI used in Example #1 according to an embodiment of the present invention.

In this example, a GUI is developed for a bank data entry application. The overall processing flow applicable to example #1 is depicted in FIG. 4A. A design-time model representation 402 is provided encapsulating the GUI for the application. A visual representation of the model representation for the bank data-entry application GUI is depicted in FIG. 4B. As depicted in FIG. 4B, the GUI comprises several components with connections between the components. Inputs and output for the GUI components are also shown.

An XGL generator 404 is used to generate an XGL representation 406 for the model representation. XGL generator 404 may use mapping rules to transform the model representation to an XGL representation. According to an embodiment of the present invention, the XGL representation may be in the form of an XML file. An XGL representation in XML for the model representation depicted in FIG. 4B is provided in Appendix A of U.S. Provisional Patent Application No. 60/722,888 filed Sep. 30, 2005.

XGL representation 406 is then used to generate GUIs for various different devices and runtime platforms. In this example, an XGL-to-Java compiler 408 generates Java code 410 based upon XGL representation 406. Rules may be provided for mapping the XGL representation to Java code. An example of the Java code that may be generated for the bank application GUI is depicted in Appendix B of U.S. Provisional Patent Application No. 60/722,888 filed Sep. 30, 2005. The Java code may then be executed by a Java runtime environment 412 on a target device to generate a GUI 414. A screenshot of the generated GUI for a Java platform target device is depicted in FIG. 4C.

The same XGL representation 406 (e.g., the XGL representation depicted in Appendix A of U.S. Provisional Patent Application No. 60/722,888) may also be used to generate a GUI for a Flash runtime environment. As depicted in FIG. 4A, an XGL-to-Flash compiler 416 generates Flash code 418 based upon the XGL representation 406. Rules may be provided for mapping the XGL representation to Flash code. An example of the Flash code that may be generated for the bank application GUI is provided in Appendix C of U.S. Provisional Patent Application No. 60/722,888 filed Sep. 30, 2005. The Flash code 418 may then be executed by a Flash runtime environment 420 on a target device to generate a GUI 422. A screenshot of the generated GUI for a Flash target device is depicted in FIG. 4D.

The XGL representation 406 (e.g., the XGL representation provided in Appendix A of U.S. Provisional Patent Application No. 60/722,888) may also be used to generate a GUI for a DHTML runtime environment. As depicted in FIG. 4A, an XGL-to-DHTML interpreter 424 is used to dynamically generate DHTML (or machine-executable code) on-the-fly based on XGL representation 410 and the DHTML is executed by a DHTML runtime environment 426 on a target device to generate a GUI 428. Rules may be provided for mapping the XGL representation to DHTML. A example screenshot of the generated GUI for a DHTML target device is depicted in FIG. 4E.

The GUIs depicted in FIGS. 4C, 4D, and 4E represent different GUIs generated for different runtime environment platforms from the same XGL representation 406. As can be seen from FIGS. 4C, 4D, and 4E, the GUI appearance and behavior is consistent across the various platforms.

Example #2

Figure 5A:
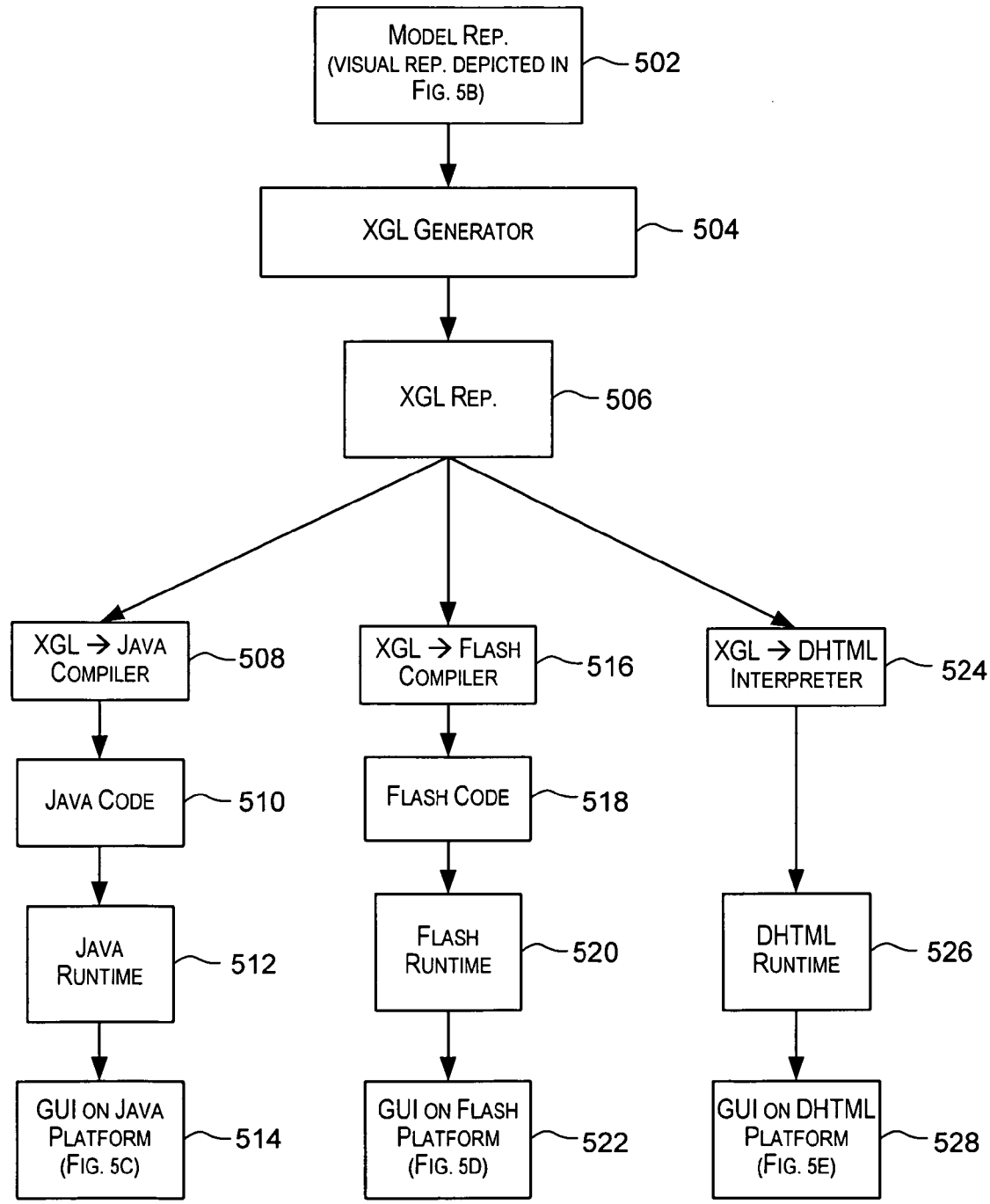
FIG. 5A depicts a processing flow applicable to Example #2 according to an embodiment of the present invention.
Figure 5B:
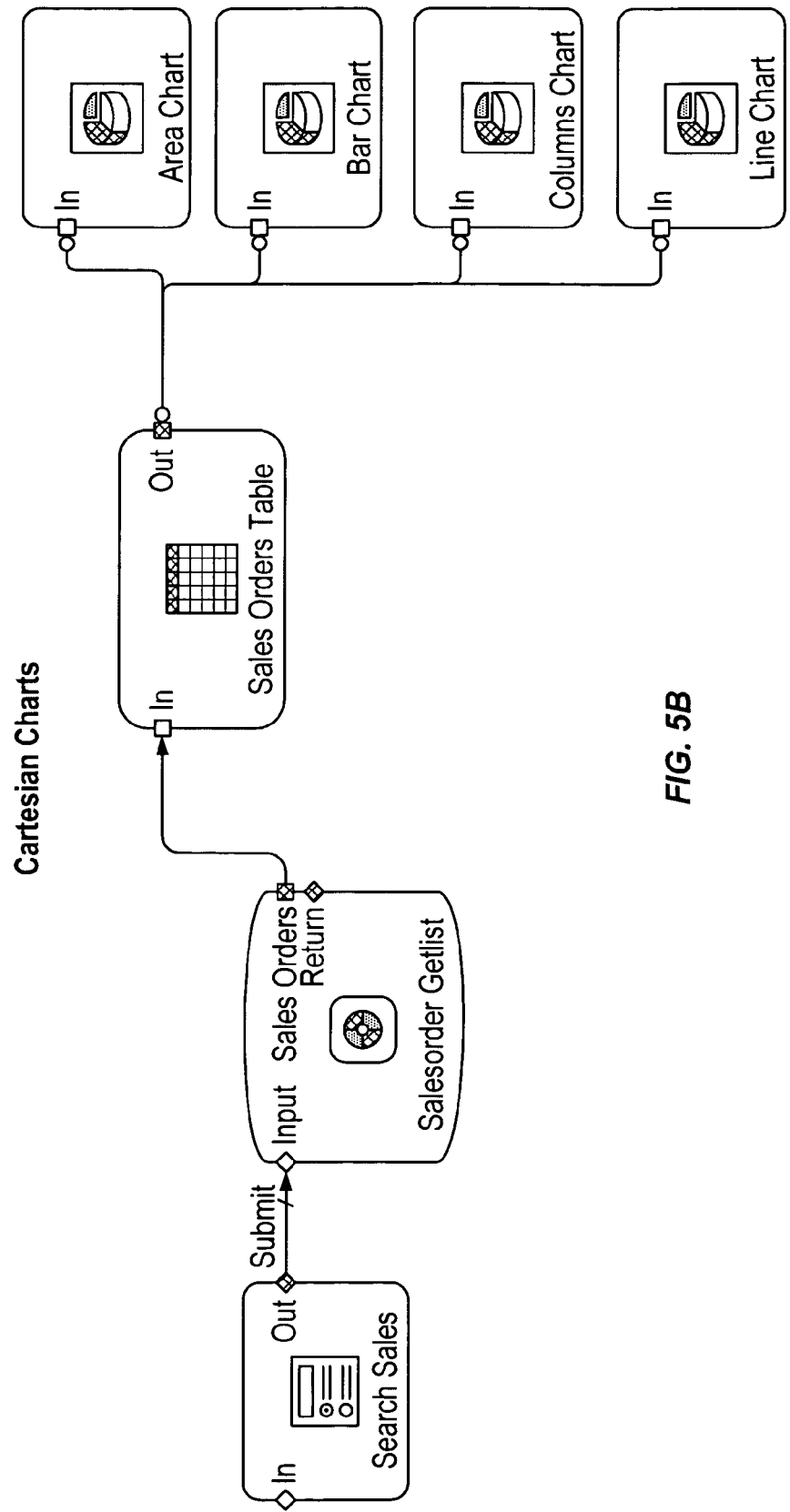
FIG. 5B depicts a visual representation of a model representation for a bank data-entry application GUI used in Example #2 according to an embodiment of the present invention.

In this example, a GUI is developed for an analytics dashboard. The overall processing flow applicable to example #2 is depicted in FIG. 5A. A design-time model representation 502 is provided encapsulating the GUI for the application. A visual representation of the model representation for the analytics dashboard application GUI is depicted in FIG. 5B. As depicted in FIG. 5B, the GUI comprises several components with connections between the components. Inputs and output for the GUI components are also shown.

An XGL generator 504 is used to generate an XGL representation 506 for the model representation. XGL generator 404 may use mapping rules to transform the model representation to an XGL representation. According to an embodiment of the present invention, the XGL representation may be in the form of an XML file. An XGL representation in XML form for the model representation depicted in FIG. 5B is provided in Appendix D of U.S. Provisional Patent Application No. 60/722,888. XGL representation 506 is then used to generate GUIs for various different devices and runtime platforms. In this example, an XGL-to-Java compiler 508 generates Java code 510 based upon XGL representation 506. Rules may be provided for mapping the XGL representation to Java code. An example of the Java code that may be generated for the analytics dashboard application GUI is provided in Appendix E of U.S. Provisional Patent Application No. 60/722,888. The Java code may then be executed by a Java runtime environment 512 on a target device to generate a GUI 514. A screenshot of the generated GUI for a Java platform target device is depicted in FIG. 5C.

The XGL representation 506 (e.g., the XGL representation provided in Appendix D of U.S. Provisional Patent Application No. 60/722,888) may also be used to generate a GUI for a Flash runtime environment. As depicted in FIG. 5A, an XGL-to-Flash compiler 516 generates Flash code 518 based upon the XGL representation 506. Rules may be provided for mapping the XGL representation to Flash code. An example of the Flash code that may be generated for the analytics dashboard application GUI is provided in Appendix F of U.S. Provisional Patent Application No. 60/722,888. The Flash code 518 may then be executed by a Flash runtime environment 520 on a target device to generate a GUI 522. A screenshot of the generated GUI for a Flash target device is depicted in FIG. 5D.

The XGL representation 506 (e.g., the XGL representation depicted in Appendix D of U.S. Provisional Patent Application No. 60/722,888) may also be used to generate a GUI for a DHTML runtime environment. As depicted in FIG. 5A, an XGL-to-DHTML interpreter 524 is used to dynamically generate DHTML on the fly based on XGL representation 510 and the DHTML is executed by a DHTML runtime environment 526 on a target device to generate a GUI 528. Rules may be provided for mapping the XGL representation to DHTML. A screenshot of the generated GUI for a DHTML target device is depicted in FIG. 5E.

Figure 5C:
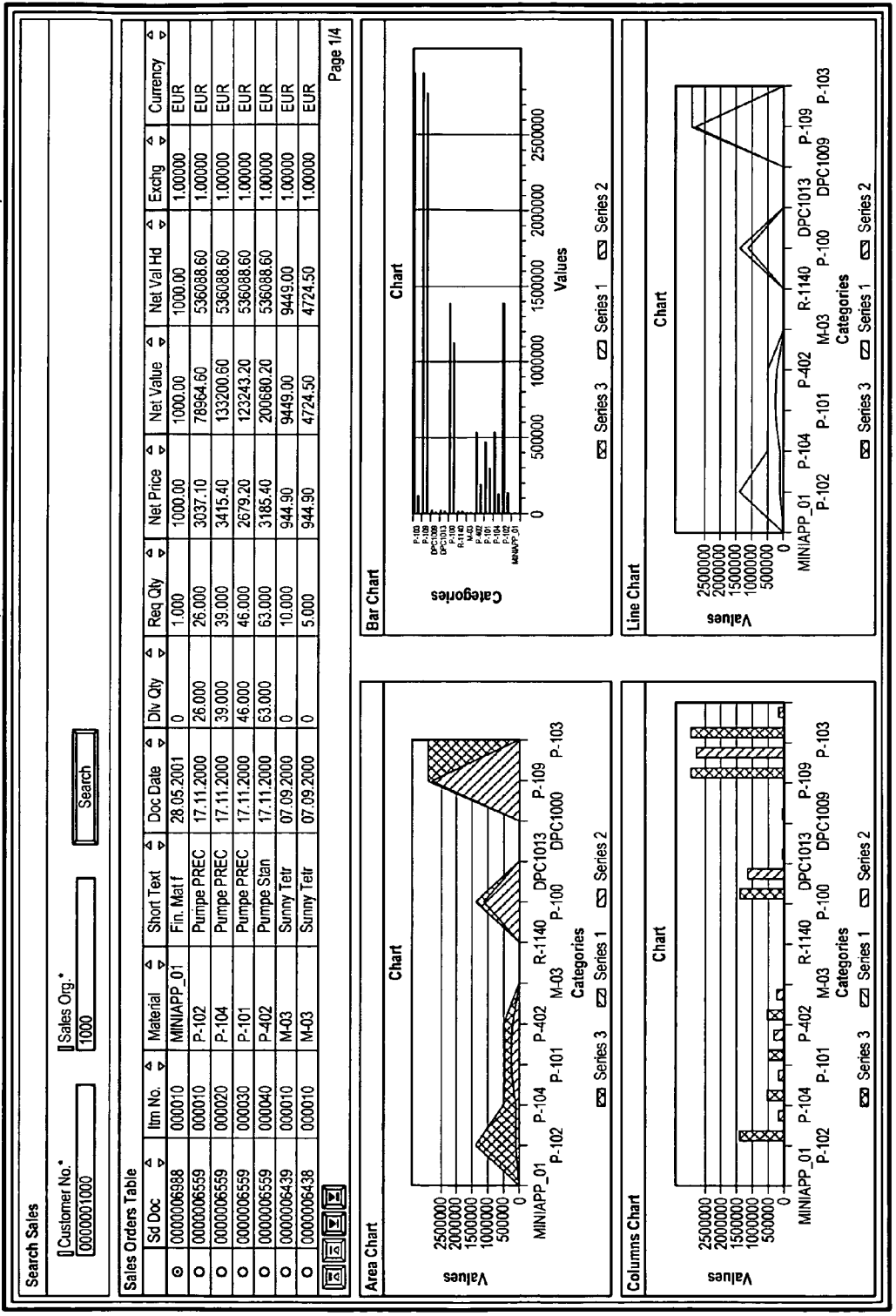
FIG. 5C depicts a screenshot generated GUI for a Java platform using an XGL representation generated for Example #2 according to an embodiment of the present invention.
Figure 5D:
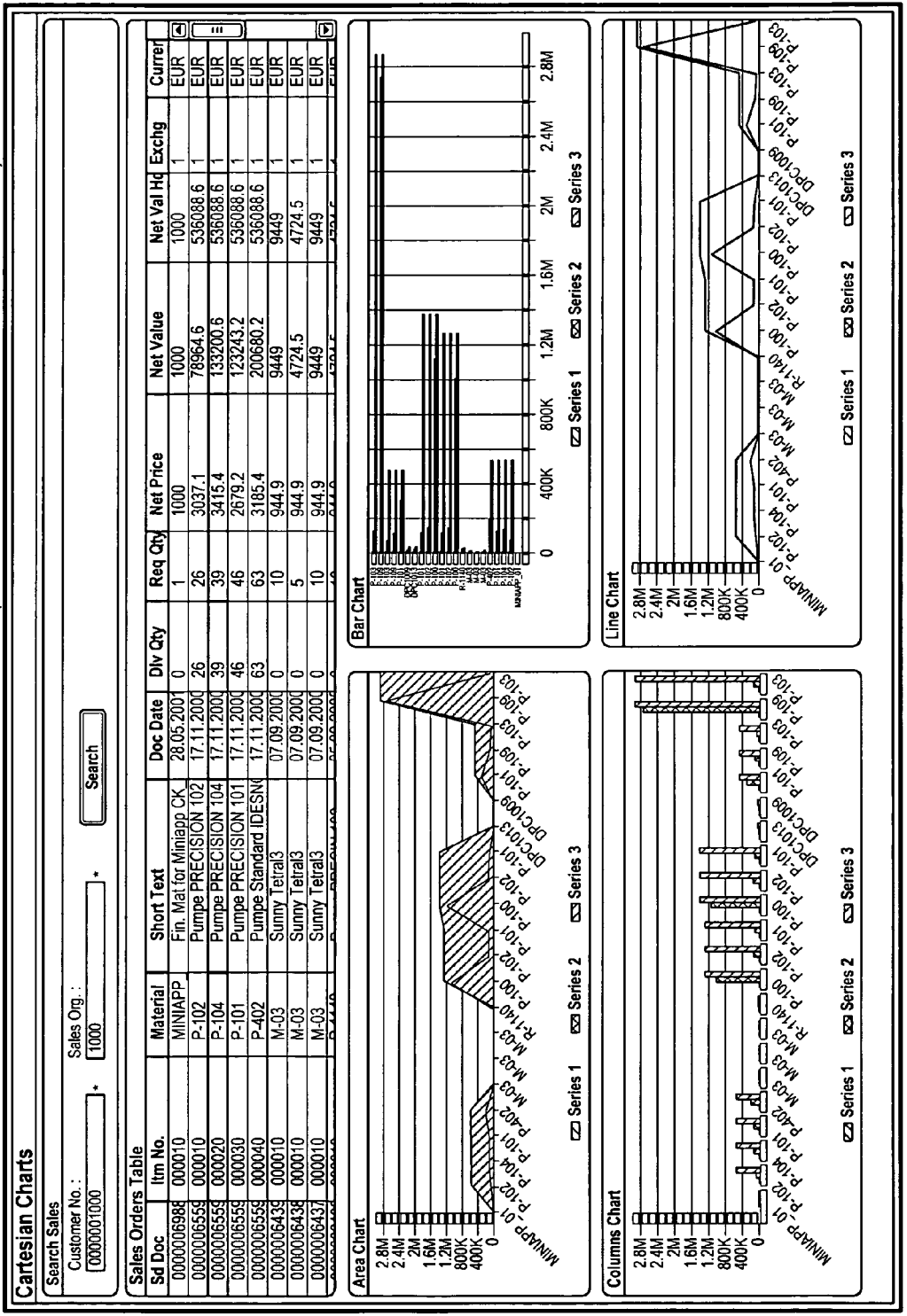
FIG. 5D depicts a screenshot generated GUI for a Flash platform using an XGL representation generated for Example #2 according to an embodiment of the present invention.
Figure 5E:
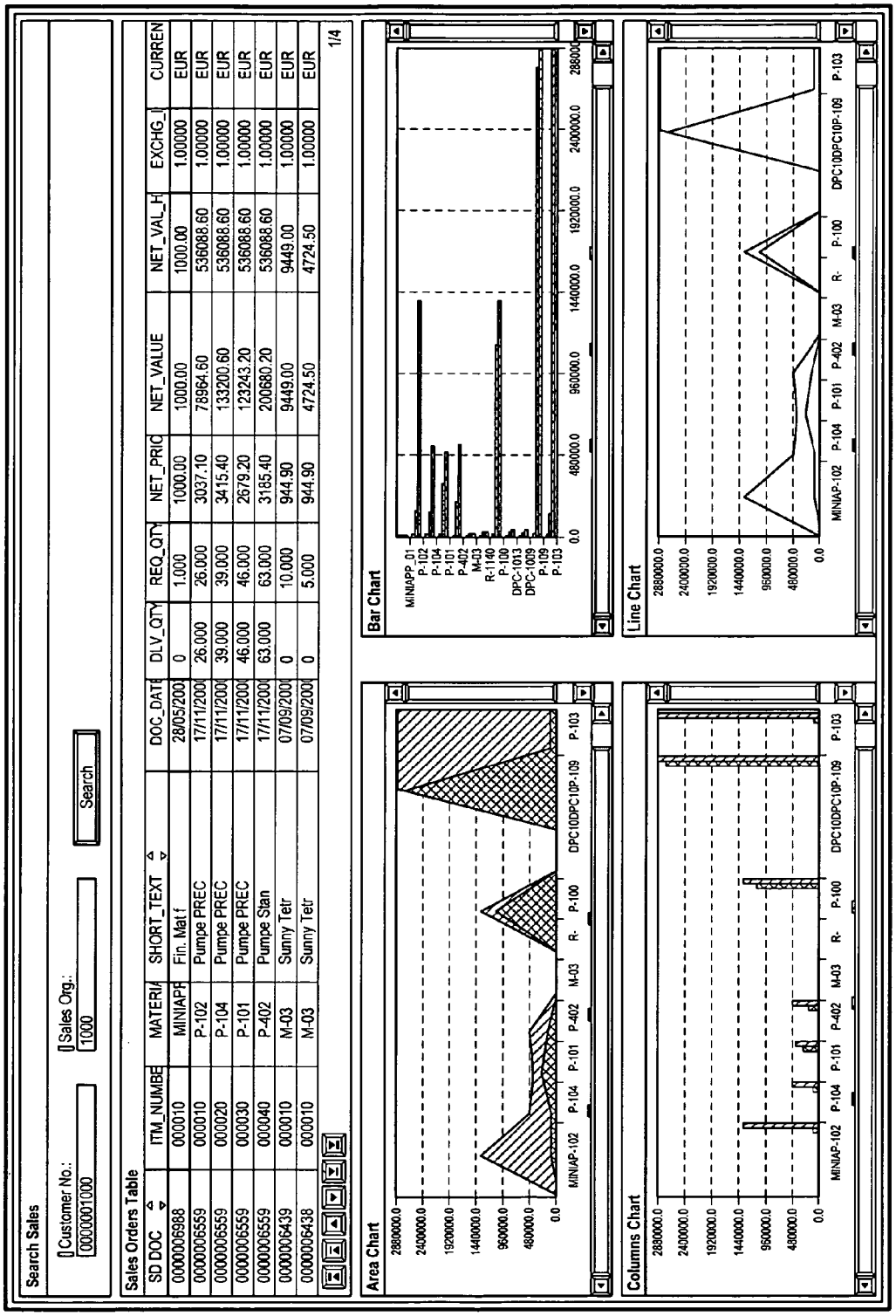
FIG. 5E depicts a screenshot generated GUI for a DHTML platform using an XGL representation generated for Example #2 according to an embodiment of the present invention.

The GUIs depicted in FIGS. 5C, 5D, and 5E represent different GUIs generated for different runtime environments from the same XGL representation 506. As can be seen from FIGS. 5C, 5D, and 5E, the GUI appearance and behavior is consistent across the various platforms.

A Sample XGL Specification (Example Embodiment)

This section describes a specific embodiment of an XGL specification. The sample embodiment described in this section is however not intended to limit or narrow the scope of the present invention as recited in the claims. Various others types of XGL specifications that are declarative and executable may also be provided in accordance with the present invention.

Details related to the XGL specification embodiment described in this section are provided in Appendix G of U.S. Provisional Patent Application No. 60/722,888 (Attorney Docket No. 017900-005900US) filed Sep. 30, 2005, the entire contents (including all the appendices) of which are herein incorporated by reference for all purposes.

This section comprises the following sub-sections:
1. Document Structure
PART I: DATA MODEL
2. Fields and Expressions
3. Infosets
4. Infoactors
5. Operators
6. Enumerations
PART II: USER INTERFACE
7. Controls
8. Interactors
9. Containers
10. Resources
PART III: EXECUTION CONTROL
11. Actions
12. Relays
13. Execution Plans
1. Document Structure
1.1 XGL Component: An XGL component specification is written in a separate XGL document. The XGL document is self-contained and provides all the information necessary in order to generate and execute the component. A sample XGL component declaration structure is depicted in FIG. 6.

The documentation for this embodiment is organized according to the XGL component structure. For example, "Part I: Data model" describes the elements that define the XGL data model including fields, infosets, infoactors, operators, and enumerations. "Part II: User interface" describes the elements that define the XGL display hierarchy including controls, interactors, and containers. This part also describes the various types of XGL resources. "Part III: Execution control" describes the elements that define the XGL execution semantics including actions, relays, and execution plans.

A Component element may have the following attributes in one embodiment:

| Attribute | Type | Description |
| --- | --- | --- |
| urn | uri | Required. The universal component name. The component urn uniquely identifies the component within the deployed system. |
| xmlns:?? | uri | These are the namespace declarations for Error! Unknown document property name. and its extension kits. |

FIG. 7 depicts a sample listing showing the skeleton of a sample XGL component according to an embodiment of the present invention.

An application is constructed from a collection of XGL components by composing them together in different ways. Components can embed other components, navigate to other components, or invoke other components in new windows. Components can pass data through input and output ports, or can share data directly.

A complete application can therefore be packaged as a collection of XGL documents with inter-dependencies, and deployed to any system that supports XGL (i.e., an XGL implementation). The XGL implementation can then open the package and run the application.

Namespaces: XGL is defined in a single namespace. In the embodiment described, the XGL namespace uses the xg prefix.

sap-xgl-namespace:
  xmlns:xg="http://www.sap.com/visualcomposer/2005/xgl"

XGL extension kits use their own namespace. Two extension kits, namely the SAP portal kit (ep) and the SAP business intelligence kit (bi), appear in this documentation:\
sap-portal-namespace:
  xmlns:ep="http://www.sap.com/visualcomposer/2005/xgl/portal"
sap-bi-namespace:
  xmlns:bi="http://www.sap.com/visualcomposer/2005/xgl/bi"

Any number of additional extension kits can be introduced, thus enabling the XGL implementation to be extended for supporting custom application requirements.

Mime type and file extension: The mime type for XGL document files is "text/xml". It is recommended that XGL files have the extension ".xgl" (all lowercase) on all platforms. It is recommended that gzip-compressed XGL files have the extension ".xglz" (all lowercase) on all platforms.

1.2 Conformance levels: XGL conformance levels may be defined according to an embodiment. Implementations adhering to the specification may choose the conformance level that they declare to support. The conformance levels may be upward-compatible, i.e., a feature that is supported in a certain conformance level is also supported in all higher conformance levels. The reverse may not be true. The design of XGL ensures at least one conformance can be achieved for most GUI frameworks. This has already been verified through implementation of specific compilers and interpreters for representative classes of GUI frameworks. Higher conformance levels may be achieved on richer GUI frameworks.

1.3 Attribute types: Various attribute types may be used in an XGL document such as bool, base64, enum, float, str, int, etc.

Part I: Data Model

2. Fields and Expressions

Fields represent storage locations for holding atomic data values. Fields are assigned values coming either from the application or from end-user input. According to an embodiment of the present invention, every field has a data type that determines what kind of values can be stored in the field. XGL is a strongly typed language, and therefore an XGL implementation guarantees that values stored in fields are always of the appropriate type.

2.1 Data Types

Primitive data types: In one embodiment XGL uses a minimal types system consisting of five primitive data types: String, Number, Boolean, Date and Time. Other primitive data types may be supported in other embodiments. All data values that are manipulated in an XGL implementation are one of the primitive data types listed above. Other types may be defined in alternative embodiments. In addition, an XGL implementation supports also the special undefined value for all data types. A field, of any data type, has an undefined value until it has been assigned a definite value. Expressions involving fields with undefined values also evaluate to the undefined value.

Application data types: An application usually handles arbitrarily more complex data types than the XGL data types. XGL does not place any restrictions, nor does it make any assumptions, on the types system of the underlying application.

Instead, XGL employs a dual types system holding both the XGL data type and the application data type on the field declaration. The tag name of a field declaration defines its XGL data type. The appName and/or appType attributes on a field declaration determine its application data type. The application data type is only applicable to real fields.

Whenever field values are fetched from the application, they are converted to the corresponding XGL data types before they are assigned to their respective fields. Conversely, whenever field values are stored back to the application, they are converted back to their original application data types.

The conversions between the two data types systems are specific to the application and to the XGL implementation and are left outside the scope of the XGL specification.

2.2 Field declaration: A field is declared by using a tag name corresponding to its data type such as depicted below. Various attributes may be used.

--- field-decl: $_{one\ of}$
    <xg:String field-attrs/>
    <xg:Number field-attrs/>
    <xg:Boolean field-attrs/>
    <xg:Date field-attrs/>
    <xg:Time field-attrs/>
field-attrs:
    name, kind, init, calc, appName, appType

---

Field categories: XGL defines three categories of fields in one embodiment (varies other categories may be provided in alternative embodiments): Real fields: Fields in this category are defined by the underlying application. Virtual fields: Fields in this category are used for temporary storage of end-user input. Calculated fields: Fields in this category are computed from the values of other fields.

Field initialization and recalculation: All fields, regardless of their category, come into existence when their containing object is created, and are removed when their containing object is destroyed. The differences between the field categories are manifested in the manner in which the fields are initialized upon creation and updated during their existence.

Objects, and the fields they contain, can be created under three different circumstances: (1) when the containing infoset is populated with data returned from the application (e.g., "Query Sales Data"), (2) when a new object is created as a result of a user interaction (e.g., "Add Row"), or (3) when an object is copied as a result of a user interaction (e.g., "Copy/Paste" or "Drag & Drop").

Depending on the object creation method and the field category, in one embodiment fields are initialized according to:

| Field Category | Populate Object | Create New Object | Copy Object |
| --- | --- | --- | --- |
| Real | Application data | init expression | Copied data |
| Virtual | init expression | init expression | Copied data |
| Calculated | calc expression | calc expression | calc expression |

Fields should be initialized according to their dependencies order. If the initialization/calculation expression of field F depends on field G, then field G should be initialized before field F. Fields that have no initial value or expression are assigned the undefined value.

Real or virtual fields bound to editable UI controls are updated whenever the end-user enters or selects a new value in the bound control. Real or virtual fields can also be assigned new values through assignment actions.

Calculated fields are recalculated whenever any of the fields on which they depend are changed. Cyclic dependencies are not allowed in XGL. If the value of field F depends on field G, then the value of field G cannot depend on field F, neither directly nor indirectly. An XGL implementation, however, should not rely on this rule and may take measures to ensure that cyclic dependencies do not result in infinite recalculation loops.

Field naming: In XGL, fields are referenced using their name attribute. The field name is made of letters, numbers, and underscores, and always starts with a letter. As a result, field names can be used as valid program identifiers in most programming languages. An XGL implementation can take advantage of this fact and use ordinary program variables for storing field values.

In the application, fields may be named using any arbitrary naming conventions. Therefore, XGL employs a dual field naming system, using the appName attribute to hold the application-specific field name. The appName attribute has no restrictions and can contain any sequence of characters. If omitted, the appName is assumed to be equal to the field's name. The appName attribute is applicable only to real fields.

Whenever fields are fetched from the application, the fields are renamed from their appName to their name before they can be instantiated in the XGL implementation. Conversely, whenever fields are stored back to the application, the fields are renamed from their name back to their original appName.

2.3 Expressions: An expression is a computation involving any number of literals, fields, operators, and functions. Expressions have a well-defined grammar and always evaluate to a single value of a determinable data type. An expression is classified into one of the following:

--- expression: $_{one\ of}$
    literal-value
    field-reference
    function-invocation
    composite-expression

---

Many XGL attributes can be written using expressions. Such attributes describe constraints that should be maintained by the XGL implementation. Consequently, the XGL implementation uses a constraints solver (a recalculation engine) that is able to detect field changes and then adjust all dependent attributes/fields so that the constraints are again satisfied.

In one embodiment, XGL restricts the constraints system to non-circular, one-way constraints, so when a field value is changed, it is clear how to compute new attributes/values to maintain the constraints. For this reason, the constraints solver can be realized efficiently using a one-way, local propagation, solving system.

Evaluation context: An expression is evaluated in a particular context, which is defined according to the XGL element in which the expression is used (the current element). In one embodiment, the expression's evaluation context consists of up to three (increasingly more specific) levels: (1) component level (the context component is always the XGL component that contains the current XGL element. An expression cannot make references to fields that are declared outside of its context component); (2) Infoset level (The context infoset is the default infoset as defined for the current XGL element. If the current XGL element is not associated with a default infoset, the context infoset is undefined.); and (3) Field level (The context field is the default field as defined for the current XGL element. If the current XGL element is not associated with a default field, the context field is undefined. If a context field is defined then the context infoset is implied to be the infoset in which the context field is declared.). The evaluation context of all XGL elements is included as part of their definition in the appropriate places throughout this documentation.

Literal values: A literal is a source code representation of a value. The syntax of a literal value depends on its data type. Examples include String, Number, Boolean, Date, Time.

Field references: Fields can be referenced in expressions using one of the following forms:

--- field-reference: one of
    infoset-id @ object-name . field-name
    infoset-id @ field-name
    @ field-name
    @@

---

Where field-name, object-name, and infoset-id are taken from the field declaration, the containing object declaration, and the containing infoset declaration, respectively. Because field-name is unique only within the scope of its containing object declaration, it is possible for two or more fields declared in different objects to have same name. Therefore, to uniquely identify a particular field, the field reference should be fully qualified with the infoset-id and object-name (form 1). If the containing infoset is a regular infoset, then the object-name part can be omitted (form 2). If the evaluation context has a defined context infoset, then any field in the context infoset can be referenced using the @field-name short-hand notation (form 3). If the evaluation context has a defined context field, then the context field can be referenced using the @@ short-hand notation (form 4). XGL field references are case-insensitive.

Functions: Functions can be used in expressions to perform predefined computations:

--- function-invocation:
    function-name ( arguments-list$_{opt}$)
function-name:
    identifier
arguments-list: $_{one\ of}$
    expression
    arguments-list, expression

---

XGL provides a set of built-in functions for the most commonly used computations. In addition, XGL supports user-defined functions for custom computations. Both built-in and user-defined functions are invoked using their name. XGL function names are case-insensitive. A function is invoked with a parenthesized arguments list (possibly empty). A function always returns a value. Both the arguments list and the return value are strictly typed.

Operators: Composite expressions are constructed from operands and operators:

```
composite-expression: one of
    unary-op expression
    expression binary-op expression
    ( expression )
unary-op: one of
    - ! not
binary-op: one of
    * / % + - & < <= > >= == != <> && and || or
```

The operands of an expression include literals, fields, functions, and other expressions. The operators of an expression indicate which operations to apply to the operands. There are two kinds of operators in one embodiment: (1) Unary operators (The unary operators take one operand and use a prefix notation (such as −x); and (2) Binary operators (The binary operators take two operands and use an infix notation (such as x+y)). Various operators are available in XGL. When an expression contains multiple operators, the precedence of the operators controls the order in which the individual operators are evaluated. For example, the expression x+y*z is evaluated as x+(y*z) because the * operator has higher precedence than the + operator. When an operand occurs between two operators with the same precedence, the operators are evaluated from left to right (left-associativity). For example, the expression x+y+z is evaluated as (x+y)+z. Precedence and associativity can be controlled using parentheses. For example, the expression x+y*z first multiplies y by z and then adds the result to x, but the expression (x+y)*z first adds x and y and then multiplies the result by z.

Scope and access rules: Expressions are scoped by their context component. An expression can reference any field declared within its context component, including fields that are declared in infosets other than its context infoset. But, an expression cannot reference fields that are declared outside of its context component. This is in accordance with the component encapsulation principle.

Expression dependencies are also scoped by their context component. Whenever a field value is changed within a component, all expressions that depend on this field must be recalculated. The recalculations can propagate anywhere within the context component, but they do not propagate directly outside of the context component.

The values of a field referenced in an expression is taken from the current object of its respective infoset. When a field cannot be accessed for any reason (for example, its respective infoset is empty), the field's value is considered undefined. An expression that depends on an undefined field evaluates to the undefined value.

Implicit conversions: A conversion enables an expression of one type to be treated as another type. Conversions can be implicit or explicit, and this determines whether an explicit cast is required. Implicit conversions can occur in when the actual arguments of a function or an operator do not match its formal arguments. For instance, the conversion from type Number to type String is implicit, so the expression 'B' & 52 can implicitly be treated as the expression 'B' & '52', which evaluates to 'B52'. XGL defines implicit conversions in various cases. Conversions may never cause exceptions to be thrown. If an implicit conversion doesn't succeed, the expression evaluates to undefined. If a conversion is required but there is no suitable implicit conversion, the expression evaluates to undefined.

Deterministic expressions: An expression is deterministic if all its dependencies remain stable across all enabled execution plans. An XGL component is well-defined only if all the expressions that are used in the component are deterministic. While the XGL language requires that an XGL component specification be well-defined, this requirement may not always be enforced by the modeling tool. Therefore, in deterministic expressions may be encountered by an XGL implementation at runtime. The behavior in such a case is currently unspecified, and left to the XGL implementation.

2.4 Built-in functions: XGL provides a set of built-in functions for commonly used computations including string functions, numeric functions, scientific functions, date functions time functions, and conditional functions.

2.5 User-defined functions: User-defined functions are supported in XGL, and can be used for extending the set of built-in functions. Basic statements for assignment, selection, and iteration are allowed in user-defined functions as described in this section. The user-defined functions are declared in the Functions section of an XGL document:

```
<xg:Data>
    <xg:Functions>
        function-decl_many
    </xg:Functions>
</xg:Data>
```

The Function element declares a user-defined function. In one embodiment, the function has a unique name, a typed list of parameters, a return type, a list of local variables, and a statements body. The function's parameters list is declared using the Parameters block. If the function has no parameters, the Parameters block can be omitted. During function invocation, the parameters are passed by value and appear as local variables within the body of the function. The order of the parameters in the Parameters block defines the order in which the actual parameter values should be passed.

A function can use local variables for storing intermediate computations. Local variables are declared using the Variables block. If the function has no local variables, the Variables block can be omitted. Both parameters and local variables are typed using any of the XGL data types and named using a valid identifier.

The function body is made of a list of statements that are executed when the function is invoked. The statements should be wrapped in a CDATA construct to prevent them from being interpreted as XML.

Different statement types may be used. XGL provides statements for assignment, selection, iteration, and function termination. Only the basic statement types are provided, to facilitate the translation of user-defined functions to any target programming language. The assignment statement can be used for assigning an expression to a local variable. An assignment is written using the set statement. The conditional if statement selects a statements list for execution based on the value of a conditional expression. The while statement repeats the execution of a statements list zero or more times, depending on the value of a conditional expression. The return statement terminates the function's execution and returns the value of the specified expression. The return value must have the same type as the function's declared return type. The return statement should be the last statement in the function body (in every possible execution path). If the function terminates without reaching a return statement, then its return value is considered undefined.

2.6 Expression parsing support: An XGL implementation parses and translates XGL expressions and user-defined functions into the programming language of its target GUI framework. While this can be accomplished using standard compilation techniques, the XGL implementation can be simplified by taking advantage of the expression parsing facilities provided by the XGL generator.

Expression translator: The XGL generator includes a built-in translator for a selected set of commonly-used programming languages (the exact set of supported languages depends on the version of the generator that is used). If the programming language required for an XGL implementation is one of the supported languages, then the XGL generator can be configured to translate the XGL expressions directly into the target programming language.

Expression dependencies: The XGL generator can be configured to extract the expression dependencies and produce them as part of the generated XGL document. The expression dependencies information is required for the recalculation engine, and so it is handy to be able to obtain this information without having to actually parse the source expressions. The expression dependencies are produced in special attributes marked with the .refs suffix. For each XGL attribute attr that contains an expression, a corresponding attribute named attr.refs is also generated. The attr.refs contains the attr expression dependencies in a space-separated list. If the attr is a composite expression that does not have any dependencies, then attr.refs is set to the special value '1'. If the attr is a literal value or is undefined, then attr.refs is left empty.

3. Infosets

An infoset represents a passive data structure which holds the data being processed by one or more associated actors. Infosets aggregate closely related information objects, which in turn are composed of information fields. Infosets typically hold snapshots of application data, including all modifications to the data that were induced by user interface activities. Since infosets are the only means for storing data on the user interface level, the collection of all infosets in an XGL component completely and accurately captures the component's state. Infosets are declared in the Infosets section of an XGL document:

```
<xg:Data>
    <xg:Infosets>
        infoset-decl_many
    </xg:Infosets>
</xg:Data>
```

3.1 Infoset declaration: According to an embodiment, infosets are classified into infoshapes (infoset types), which are mainly distinguished by the way in which they organize and access objects. Examples of infoshapes include singleton, array, map, and tree. The infoset declarations are defined accordingly:

```
infoset-decl: one of
    singleton-infoset
    array-infoset
    map-infoset
    tree-infoset
    cluster-infoset
infoset-attrs:
    id, regularity, capacity, dynamic
```

Examples of common infoset attributes include id, regularity, capacity, dynamic, and others.

Infoset cursor: All infosets maintain a cursor—that is, a pointer to the current infoset object. A non-empty infoset always has exactly one current object. When the infoset is populated with new data, the cursor is set to the first object in the infoset. The cursor can subsequently be moved to other positions in the infoset, but it is always kept within the bounds of the infoset—even when objects are inserted or removed.

The current infoset object is the context object for all expressions that reference fields in the infoset. The values of the fields referenced in an expression are always taken from the current object. It is not possible to write an expression that accesses fields in other objects in the infoset.

If the infoset is empty, then the infoset's cursor and current object are undefined. Consequently, field references to an empty infoset also evaluate to undefined.

3.2 Infoset types: Various infoset types are provided. Examples include Singleton infoset, Array infoset, Map infoset, Tree infoset, Cluster infoset, and others.

3.3 Object types: Object type declarations appear inside infoset declarations. Object type declarations are used to define the type or types of objects that can be stored in an infoset. An object type declaration consists of a list of field declarations, defining the object's member fields. If the containing infoset is dynamic then new member fields can be added dynamically at runtime. An object type may be named using the name attribute. The name attribute is used for distinguishing between multiple object types in the same infoset declaration. If the name attribute is omitted, the object type is considered anonymous. Anonymous object types are only allowed in regular infosets. In case of a named object type, the object fields are referenced by combining the object type name with the field name. In case of an anonymous object type, the object fields are referenced simply by the field name. Object type declarations are often derived from the application. In such cases, the appName can be used to denote the technical name of the application type that corresponds to the object type. If two object type declarations have the same appName, it follows that they must have identical field declarations.

An object type implements the following abstract interface in one embodiment:

| Method | Description |
| --- | --- |
| clone( ) : Object | Clones the object |
| getField(name): Variant | Gets the value of a specified object field |
| setField(name, value) | Sets the value of a specified object field |

Object type compatibility, Infoset compatibility, and Infoset regularity properties may be defined. A regular infoset is an infoset in which all objects have exactly the same type. Therefore, a regular infoset declaration always contains one object type declaration. Both named and anonymous object types can be used in a regular infoset declaration. An irregular infoset is an infoset in which objects may be of different types. A semi-regular infoset is an irregular infoset in which all the object types are derived from the same base type. In both cases, the different object type declarations are distinguished by the object type names, and therefore anonymous object types are not allowed. The regularity measure has an affect on the type of presentations that are possible for the infoset data.

3.4 Infoset data handling: Various data handling operations may be provided including:

data mapping operations (data mapping refers to the process of transferring data from a source infoset into a target infoset);

data copying (data copying is a special form of data mapping, where the mapping is derived from the source and target infosets);

data binding (data binding refers to the process of tying the data in an infoset to an interactor for display and editing; a data binding is specified on two levels: first an infoset is bound to an interactor, then individual fields in the infoset are bound to individual controls in the interactor.);

data fusing (in some cases, when two infosets are identical, an XGL implementation may choose to fuse them together into a single infoset. This technique is called data fusing and is an optimization technique intended to conserve memory.)

3.5 Input and output ports: A common use of infosets is for passing parameters through actor ports. Ports are named connection points through which parameters flow between actors during execution. In one embodiment, each port is associated with an infoset, which holds the parameters that are sent or received through the port. Ports are uni-directional and are therefore divided into: Inports (input ports), used for sending input parameters to an actor when it is evaluated; and Outports (output ports), used for receiving output parameters from an actor after it has been evaluated. Port declarations appear inside the declarations of their containing actors, such as infoactors, operators, and certain kinds of interactors and relays.

4. Infoactors

Infoactors represent application data services, and are used for interacting with and transferring data from/to the application. In a typical XGL component, infoactors send requests to application data services, wait for the responses, and then copy the result data to designated infosets. The communication is carried out over a variety of protocols, including XML/HTTP, Web services, Java objects, etc. Infoactors are declared in the Infoactors section of an XGL document:

```
<xg:Data>
    <xg:Infoactors>
        infoactor-decl_many
    </xg:Infoactors>
</xg:Data>
```

XGL does not define any concrete infoactors on its own. Instead, infoactors are defined in specialized extension kits, and their declarations belong to their respective kit namespaces rather than to the default XGL namespace. New infoactors can be introduced by implementing new extension kits, thus enabling an XGL implementation to be extended for supporting any application data sources that may be required.

4.1 Infoactor declaration: The general structure of an infoactor declaration is shown below:

```
infoactor-decl:
    <infoactor-type infoactor-attrs>
        ports-decl
    </infoactor-type>
infoactor-attrs:
    id, systemAlias, systemType
```

Examples of common infoactor attributes include: id (uniquely identifies the infoactor within the XGL component), systemAlias (the infoactor's system alias), systemType (the infoactor's system type); and others. The concrete infoactor tag name and attributes depend on the infoactor type. The body of the infoactor declaration contains the infoactor's input and outport ports.

Infoactor evaluation: Infoactors are evaluated on designated steps in execution plans. Before an infoactor is evaluated, the input parameter values are assumed to have been copied and made available in the respective inport infosets. The infoactor is evaluated by sending a request to the data service represented by the infoactor, using the input parameter values on its inport infosets. The format and protocol used for sending the request depend on the infoactor type, the service architecture of the underlying application, and the XGL implementation. After sending the request, the infoactor waits for a response from the data service. Depending on the XGL implementation, this can be done synchronously or asynchronously. In either case, the execution plan is not advanced until the data service response is received and processed. If a successful response is returned by the infoactor, the data service results are copied to the respective outport infosets, and the execution plan is continued. If the infoactor request fails, this typically indicates a fatal error condition that cannot be recovered from, such as response timeout, invalid response format, or other communication problems. Therefore, when an infoactor failure is encountered, the execution plan is aborted, and an error message is prompted to the user. Error conditions raised by the data service are not considered fatal errors, and are not treated in the same manner as infoactor failures. Usually, data service errors are reported using special status fields in the outport infosets, and can be used as guard conditions to control the flow of the remainder of the execution plan.

System aliases: Infoactors are mapped to their respective backend systems using system aliases rather than actual system connections (the systemAlias attribute). During deployment, the system aliases used in the infoactor declarations are replaced with the actual system connections, according to the deployed systems landscape.

4.2 Remote functions: The SAP Portal kit extends XGL with a set of infoactors that can be used for remote function invocation, including SAP R/3 functions, JDBC functions, and third-party functions, through the portal connectors framework. Various infoactors are provided such as SAP-Function infoactor, JDBCFunction infoactor, and External-Function infoactor.

4.3 BI queries: The SAP BI kit extends XGL with a set of infoactors that can be used for invoking a variety of BI/BW queries. Examples include BIOGMLQuery infoactor, BIRG-MLQuery infoactor, BIWGMLInfoObject infoactor, BIWG-MLQuery infoactor, and others.

5. Operators

Operators are generic computation units that transform input infosets into output infosets. The transformation carried out by an operator can change the infoset's data values, the infoset's structure, or both. Operators are declared in the Operators section of an XGL document:

```
<xg:Data>
    <xg:Operators>
        operator-decl_many
    </xg:Operators>
</xg:Data>
```

Operators can be viewed as specialized infoactors built into XGL. Operators are evaluated according to the infoactor evaluation rules, except that they are always evaluated synchronously and they are never expected to throw exceptions.

5.1 Unary operators: Unary operators are operators that transform a single input infoset (named "IN") into a single output infoset (named "OUT").

```
unary-operator: one of
    filter-operator
    sort-operator
    lower-operator
    upper-operator
    distinct-operator
    sigma-operator
    group-operator
```

Examples of unary operators include: (1) Filter operator (FilterOp is a unary operator that filters the objects in an infoset according to specified criteria); (2) Sort operator (the SortOp is a unary operator that sorts the objects in an infoset according to a specified sorting order); (3) Lower range operator (the LowerOp is a unary operator that extracts from an infoset the specified number of objects that have the lowest values in a given range field); (4) Upper range operator (the UpperOp is a unary operator that extracts from an infoset the specified number of objects that have the highest values in a given range field); (5) Distinct operator (the DistinctOp is a unary operator that restricts the objects in an infoset to distinct occurrences of a specified set of key fields); (6) Sigma operator (the SigmaOp is a unary operator that aggregates all objects in an infoshape into a single object by applying a specified set of field grouping functions); (7) Group operator (the GroupOp is a unary operator that groups objects in an infoshape according to a specified set of grouping fields, and then applies a specified set of sigma functions on the grouped objects).

5.2 N-ary operators: N-ary operators are operators that transform multiple input infosets (named "IN1,IN2, . . . ,INX") into a single output infoset (named "OUT").

```
nary-operator: one of
    union-operator
    intersect-operator
    subtract-operator
    combine-operator
```

Examples of n-ary operators: (1) Union operator (the UnionOp is a n-ary operator that returns the union of two or more infosets according to a specified set of key fields); (2) Intersection operator (the IntersectOp is a n-ary operator that returns the intersection of two or more infosets according to a specified set of key fields); (3) Subtraction operator (the SubtractOp is a n-ary operator that returns the subtraction of two or more infosets according to a specified set of key fields); (4) Combine operator (the CombineOp is a n-ary operator that combines the current objects of two or more infosets into a single object).

6. Enumerations

An enumeration is a discrete values space defined as a list of {value:text} items. Enumerations are used for restricting data field values or for providing values help in input controls. Enumerations can be static or dynamic. Enumerations are declared in the Enumerations section of an XGL document:

```
<xg:Data>
    <xg:Enumerations>
        enumeration-decl_{many}
    </xg:Enumerations>
</xg:Data>
enumeration-decl:
    static-enumeration:
    dynamic-enumeration:
```

6.1 Static enumerations: Static enumerations are defined using a fixed list of items.

6.2 Dynamic enumerations: Dynamic enumerations are defined using an infoactor that returns the enumeration items dynamically at runtime:

Dynamic enumeration input: The dynamic enumeration contains a standard infoactor declaration that is used for retrieving the enumeration items at runtime. Any one of the supported XGL infoactor types can be used in a dynamic enumeration. The enumeration's infoactor is not part of any execution plan. It is evaluated when the enumeration is first accessed, or whenever any of its input field values is changed due to recalculation. The input infoset of the enumeration's infoactor controls the enumeration by defining its input parameters using calculated fields. The calculation expressions of the enumeration's input fields are defined in the context of the element that uses the enumeration, but the expressions can also contain fully qualified references to any field in the component. Whenever any of the enumeration's input fields is recalculated, the enumeration becomes invalid and its infoactor needs to be reevaluated. The reevaluation of the enumeration infoactor can be delayed by the XGL implementation until the next time the enumeration is accessed. However, if the enumeration is actively used in the current state of the user interface, then it should be immediately reevaluated. For example, if the enumeration is used for defining the entries list in a radio buttons group, the radio buttons need to be immediately redrawn whenever the enumeration is invalidated. If the calculation expressions of the enumeration's input fields do not contain any field references (i.e., they are constant expressions), then the enumeration needs to be evaluated at most once (when it is first accessed).

Dynamic enumeration output: The output infoset of the enumeration's infoactor defines the enumeration items. Whenever the infoactor is reevaluated, the output infoset objects are used for populating the enumeration by creating a corresponding enumeration item from each output object. Each enumeration item is created by computing its value and text using the value and text expressions. The value and text expressions are evaluated in the context of the output object that corresponds to the enumeration item. The sort attribute controls how the enumeration items are ordered. If sort is set to true, the enumeration items will be sorted by their display text. Otherwise, the enumeration items will be arranged according to the order of their corresponding output objects. The duplicates attribute controls whether duplicate enumeration items are allowed. Two enumeration items are considered duplicate if they have the same value. By default, duplicate enumeration items are not allowed (and will be discarded).

Static items in a dynamic enumeration: A dynamic enumeration can contain special items that always exist, regardless of the enumeration's infoactor output. The static items are defined by declaring a static enumeration inside the dynamic enumeration. The static items always appear before the dynamic items of the enumeration, even when the sort attribute is set to true.

Part II: User Interface

7. Controls

Controls represent the atomic parts of a user-interface, such as Button, InputField, ComboBox, or Slider. Most controls are bound to data fields and are used for displaying or editing field values. Controls are placed inside interactors, which arrange their layout and govern their behavior. The type of interactor dictates the types of controls that can be placed in it.

For the most part, XGL defines only the behavioral aspects of the controls, and intentionally ignores their visual aspects. The exact appearance of the controls is left to the XGL implementation, and depends mostly on the rendering framework and branding guidelines. Ordinarily, the controls appearance can be customized at runtime by cascading style sheets, or other similar customization schemes.

The XGL controls set is not an attempt at establishing the lowest common denominator of all existing GUI frameworks. Instead, the XGL controls set was designed based on business application requirements, and is intended to be rich enough for capturing the intentions of the application designer as accurately as possible.

Due to the wide variations that are manifested across different GUI frameworks, it is likely that there will not be a direct mapping between the abstract XGL controls and the native controls available in a particular GUI framework. An XGL implementation may bridge the gap either by extending the GUI framework with new controls, or by replacing unavailable controls with other, compatible, controls.

The general structure of a control declaration is shown below:

```
control-decl:
    <control-type control-attrs/>
```

Examples of available control types, their classification criteria, and applicable attributes are detailed in Appendix G of U.S. Provisional Patent Application No. 60/722,888 filed Sep. 30, 2005.

7.1 Control attributes: Various control attributes are provided. Control attributes that are specified using expressions create dynamic constraints that require the control to be repainted whenever the attribute values change. The recalculation of dynamic attribute values follows the expression evaluation rules. The evaluation context for all control attributes is always the current object in the infoset of the containing interactor. Most of the control attributes apply to more than one control type. Refer to the control types descriptions to determine which control attributes are applicable for each control type.

Data attributes: define the data field bound to the control and its values space. The data attributes apply to data-bound controls.

Positioning attributes: The positioning attributes are used for determining the position, size, stacking order, and tabbing order of the controls within their containing interactor. The exact interpretation of the positioning attribute values depends on the interactor type, its layout method, and its scaling mode.

Style attributes: The style attributes are used for tailoring visual aspects of the controls. The exact appearance of the controls depends on the GUI rendering framework:

Display attributes: The display attributes define how the control is displayed and formatted:

Validation attributes, Interaction attributes.

7.2 Input controls: Input controls are free-form data entry controls. When an input control receives the input focus it displays a flashing caret that indicates the insertion point. The user can then enter text, move the insertion point, or select text to be edited by using the keyboard or the mouse. Examples include: InputField control (InputField is a single-line input control supporting all data types); TextEdit control (TextEdit is a multi-line text editing control with support for line breaks, word wrapping, and scrolling); ComboBox control (ComboBox is a combination of DropDown and InputField controls. Like a DropDown control it consists of a dropdown list and a selection field. The list presents the possible values that a user can select and the selection field displays the current value. Unlike a DropDown control, the selection field is an editable InputField that can be used to enter values not available in the list.).

7.3 Selection controls: Selection controls enable the user to select a value from a discrete set of possible values, which are defined using an enumeration. Selection controls are restricted and cannot contain values that are not defined in the enumeration. Examples include: DropDown control (A DropDown is a selection control consisting of a dropdown list and a selection field. The list presents the possible values that a user can select and the selection field displays the currently selected value.); ListBox control (a ListBox is a selection control consisting of a list that presents the possible values that a user can select. The user can select a value by clicking on the corresponding list item. Exactly one item in the list can be selected at any time.); RadioGrp control (a RadioGrp is a selection control consisting of a group of radio buttons, one for each of the possible values that a user can select. The user can select a value by clicking on the corresponding radio button. Exactly one radio button in the group can be selected at any time.); UList control (an UList is a selection control used for creating unordered menus. The possible options are presented in a bulleted list.); OList control (an OList is a selection control used for creating ordered menus. The possible options are presented in a numbered list.); CheckBox control (a CheckBox is a dual-state selection control used for setting or clearing Boolean fields.); ToggleButton control (a ToggleButton is a dual-state selection control used for setting or clearing Boolean fields.);

7.4 Range controls: Range controls enable the user to select a value from a continuous range of values, defined using min/max values and an optional step value (precision). The range can be bound on both sides (both min and max are specified), bound on one side (either min or max are specified), or unbound (neither min nor max are specified). Examples include: spinner control (a Spinner is a numeric range control with up/down buttons for stepping through the values in the range.); HSlider and VSlider controls (an HSlider/VSlider is a numeric selection control that lets the user select a value by moving a slider thumb between the end points of a horizontal/vertical slider track.); HRange and VRange controls (an HRange/VRange is a numeric selection control that lets the user select a range of values by moving two slider thumbs between the end points of a horizontal/vertical slider.); DatePicker control (a DatePicker is a date selection control that allows the user to select a date using a dropdown calendar); Calendar control (a Calendar is a date selection control that allows the user to select a date or a range of dates using a navigable monthly calendar.).

7.5 Readonly controls: Readonly controls are non-editable controls used for displaying values that cannot be modified by the user. Readonly controls are typically used for displaying calculated fields. Examples include: CalcField control (a CalcField is a readonly control for displaying a calculated value in a single-line textbox.); ProgressBar control (a ProgressBar is a readonly control for displaying numeric values using a gradually filled bar.); Gauge control (a Gauge is a readonly control for displaying numeric values on a radial scale.); Clock control (a Clock is a readonly control for displaying time values in an analog clock.); Ticker control (a Ticker is an animated readonly control for displaying values on a continuously revolving display strip.); ImageLoader control (an ImageLoader is a readonly control that is used for downloading and displaying external images. To display embedded images, use the Image control.); MediaPlayer control (a MediaPlayer is a readonly control that is used for downloading and playing streaming media. The MediaPlayer consists of a media display and an optional media controller that lets the user control the media playback.).

7.6 Unbound controls: Unbound controls are controls that are not bound to any data field. Unbound controls are typically used for decorating the display or for invoking actions. Examples include: Button control (a Button is an unbound control that is used for invoking actions when it is clicked with the mouse or the keyboard.); PlainText control (a PlainText is an unbound control that is used for displaying a text message with uniform formatting.); HtmlText control (an HtmlText is an unbound control that is used for displaying an html-formatted fragment.); Image control (an Image is an unbound control that is used for displaying an embedded image. The Image control can only be used for images that are embedded inside the XGL component.); HSeparator and VSeparator controls (a HSeparator/VSeparator is an unbound control that is used for displaying a horizontal/vertical separator line.).

7.7 Plotting controls: Plotting controls are used for plotting data field values on graphical displays such as charts, time lines, maps, and graphs. Examples include: CategoryAxis control (a CategoryAxis control is used in charts to map discrete categorical data contained in a given field (for example, states, product names, or department names) to an axis and space them evenly along it. The CategoryAxis accepts all data types.); DataSeries control (a DataSeries control is used in charts to plot the values of a numeric field as a group of related data points. The exact manner in which the DataSeries is visualized depends on the specific chart type.); LegendEntry control (a LegendEntry control is used for defining individual legend items in visual interactors that use a legend.); TimePeriod control (a TimePeriod control is used in calendar views and time lines to plot data values over date/time periods.); MapPoint control (a MapPoint control is used in map views to plot points of interest by mapping data values to locations on the map.); PivotData control (a PivotData control is used in pivot tables to define the aggregated data fields.); PivotRow and PivotColumn controls (the PivotRow and PivotColumn control are used in pivot tables to define the row and column grouping fields.).

8. Interactors

Interactors represent tightly coupled units of interaction, such as FormView, GridView, or ChartView, that enable the user to view application data and to carry out related tasks. Interactors are displayed in rectangular regions and are arranged using a hierarchy of containers to form the user interface display.

XGL provides a collection of highly generic and reusable interactor types that can meet most demands of typical business applications. New interactors can be introduced by implementing extension kits, thus enabling an XGL implementation to be extended for supporting specialized application requirements.

The different types of interactors are broadly classified into three categories according to an embodiment of XGL: data-entry interactors, data-visualization interactors, and composite interactors. They are explained in the following sections.

interactor-decl: $_{one\ of}$
    data-entry-interactor
    data-visualization-interactor
    composite-interactor 8.1 Data-entry interactors: A data-entry interactor is an interactor that is bound to a single infoset and enables the user to view and edit the infoset's data using designated controls. The specific types of controls that can be used and the manner in which they are arranged into a visual display depend on the interactor's type. The binding between a data-entry interactor and its infoset is bi-directional, so changes in one are immediately reflected in the other. More than one interactor can be bound to the same infoset, resulting in multiple synchronized views over the same data. In one embodiment, the data-entry controls are defined in one of the following two forms, depending on the infoset's regularity measure.

Examples of data-entry interactors:

FormView interactor (a FormView interactor is used for displaying and editing an infoset in a single data entry form. The form always displays the current infoset object (§3.1.1). Whenever the infoset's cursor is moved to another object, the form controls are repainted to reflect the new object's data. If there is no current object (e.g., the infoset is empty), then the form is cleared and all controls are disabled.);

TileView interactor (A TileView interactor is used for displaying and editing an infoset in a set of repeated form blocks. TileView displays each infoset object in a separate form block, and arranges the form blocks into a grid of equally-sized tiles. The form block corresponding to the current infoset object is highlighted by changing its background or border color.);

ListView interactor (A ListView interactor is used for displaying and editing an infoset in a list of repeated form blocks. ListView displays each infoset object in a separate form block, and arranges the form blocks into a vertical list. ListView also enables the user to expand/collapse individual form blocks in the list. The form block corresponding to the current infoset object is highlighted by changing its background or border color.)

GridView interactor (A GridView interactor is used for displaying and editing an infoset in a tabular data grid. GridView displays each infoset object in a separate row and each object field in a separate column. All rows in the grid have the same columns structure, and thus contain the same controls. The row corresponding to the current infoset object is highlighted by changing its background or border color.)

TreeView interactor (A TreeView interactor is used for browsing a tree infoset using an expandable-tree display. TreeView- displays each infoset object in a separate tree node, and enables the user to expand nodes and display their child nodes. The tree node corresponding to the current infoset object is highlighted by changing its background or border color.)

8.2 Data-visualization interactors: A data-visualization interactor is an interactor that enables the user to visualize an infoset using graphical displays such as charts, calendars, time lines, maps, etc. The binding between a data-visualization interactor and its infoset is uni-directional, because a data-visualization is non-editable by definition. More than one interactor can be bound to the same infoset, resulting in multiple synchronized views over the same data. Each type of data-visualization interactor is designed to be used with specific types of plotting controls.

Examples:
ChartView interactor (A ChartView interactor is used for visualizing an infoset using the most common chart types, such as bar, column, and pie charts. Types of charts include Area chart, Bar chart, Column chart, Line chart, Pie chart, Doughnut chart, Combo chart). The ChartView attributes provide a great detail of control over the appearance of the resulting charts.
CalendarView interactor (A CalendarView interactor visualizes infoset data by mapping it to time periods on a calendar display.)
MapView interactor (A MapView interactor visualizes infoset data by mapping it to points of interest on a map display.)
PivotTable interactor (A PivotTable interactor is an interactive table that quickly combines and compares large amounts of infoset data. The user can rotate its rows and columns to see different summaries of the infoset data, and can display the details for areas of interest.)

8.3 Composite interactors: A composite interactor is an interactor whose implementation is provided by another component. In other words, a composite interactor is a component usage. Composite interactors are used to break down a large application into modular components, to reuse components across applications, and to extend applications with custom components. Each composite interactor creates a new component usage that maintains its own state, even if multiple composite interactors reference the same component implementation. The component that implements the composite interactor can in turn be further decomposed using composite interactors. This decomposition can continue to an arbitrary number of levels. The composite interactor uses input and outport ports to map data to the incoming and outgoing signals of the component usage. The input and outport ports are declared using the standard ports declaration). Examples include: WhiteBox interactor (A WhiteBox interactor is a composite interactor that is implemented by another XGL component (that is, a component generated from the user interface model).); BlackBox interactor (A BlackBox interactor is a composite interactor that is implemented by an external component (that is, a custom component implemented by programming).); HtmlView interactor (A WhiteBox interactor is a special BlackBox interactor used for displaying HTML documents.).

9. Containers

A container is a rectangular region of the user interface, within which interactors and other containers are placed. A container has predefined rules that control the layout and visibility of its children, according to the container's type. The root container is the Window container, which represents the entire drawing surface of the XGL component. The Window container and all the containers that are nested in it form a hierarchical structure that governs the arrangement of interactors on the display window. The different types of containers are broadly classified into two categories according to an embodiment: spatial containers and temporal containers.

container-decl: *one of*
spatial-container
temporal-container 9.1 Spatial containers: Spatial containers are containers that arrange their children in space. The spatial container's children are all visible at the same time (except when they are explicitly hidden) and are sized and positioned according to the container's layout rules. Examples of XGL of spatial containers supported by XGL include canvas-container, hflow-container, vflow-container, and others. Spatial containers have no visual parts. They are pure layout containers and do not directly contribute to the visual appearance of the user interface in any way. Only temporal containers are allowed as direct children of spatial containers. Interactors and spatial containers cannot be directly nested within a spatial container (but can be indirectly nested, by introducing a temporal container in between). The spatial container's children are clipped by the container's display area. If the actual children areas exceed the container's display area, then scrollbars can be used to bring the clipped areas into view. Depending on the spatial container's type, the user may be allowed to resize and reposition the children using direct manipulation techniques.

Examples of Spatial Containers:
Canvas container (A Canvas container is a spatial container that arranges its children using absolute positioning.);
HFlow container (An HFlow container is a spatial container that arranges its children in a horizontal flow.);
VFlow container (A VFlow container is a spatial container that arranges its children in a vertical flow.)

9.2 Temporal containers: Temporal containers are containers that arrange their children in time. Exactly one of the temporal container's children is visible at any point in time, and it always occupies the entire display area of the container. The user can navigate between the container's children using different navigation methods, depending on the container's type. Examples of temporal containers supported by XGL include window-container, panel-container, tabstrip-container, linkbar-container, accordion-container, linktree-container, wizard-container, and others.

Temporal containers typically have a visual frame. Depending on the container's type and attributes, the frame may include any of the following parts in an embodiment: border, titlebar, toolbar, paging bar, and navigation selector. The container's children are displayed in the area that remains after the frame and all its parts are excluded. The children of a temporal container can be either interactors or spatial containers. Temporal containers cannot be directly nested within a temporal container (but can be indirectly nested, by introducing a spatial container in between). The temporal container's children are always sized and positioned to exactly fit the container's display area. As a result, temporal containers never need to show scrollbars.

Examples:
Window container (The Window container is the top-level temporal container that represents the component's window. Because Window is the root of the XGL containers hierarchy it is a special temporal container that cannot be nested within any other container.);
Panel container (The Panel container is a simple temporal container without any navigation selector. Navigation between multiple Panel children is controlled by transitions.);
Tabstrip container (The Tabstrip container is a temporal container that enables the user to navigate between its children using a horizontal row of tabs.);
Linkbar container (The Linkbar container is a temporal container that enables the user to navigate between its children using a horizontal row of link controls.);

Accordion container (The Accordion container is a temporal container that enables the user to navigate between its children using a vertical stack of collapsible panels.);

Linktree container (The Linktree container is a temporal container that enables the user to navigate between its children using a hierarchical tree of link controls.)

Wizard container (The Wizard container is a temporal container with a read-only navigation roadmap control. Similar to Panel, the navigation between Wizard children (steps) is controlled by transitions and not through direct user interaction. However, the Wizard container also provides a roadmap display for showing the current state of the navigation.).

10. Resources

Resources are user interface artifacts used by an XGL component, such as embedded images, color palettes, and translation texts. Resources are declared in the Resources section of an XGL document:

```
<xg:Component>
    <xg:Resources>
        images-section
        palettes-section
        translations-section
        systems-section
        imports-section
    </xg:Resources>
</xg:Component>
```

By including the resource definitions within the component, the component specification becomes a self-contained document that is easier to deploy and manage.

10.1 Images: The Images section is used for defining embedded images. Embedded images are images that are already known at design-time and thus can be included directly within the XGL document. The images may be defined using base64 encoding (RFC 1421 and RFC 2045). The resultant base64-encoded images have length that is approximately 33% greater than the original images, and typically appears as seemingly random characters. If the target GUI framework supports embedded images, then the XGL implementation can take advantage of this and embed the images directly into the generated runtime component. This usually results in faster download and response times. Otherwise, the embedded images may be externalized by saving them into separate files during deployment and referencing them using URLs. Embedded images are used in the Image control. Images are also used in a variety of UI elements that require icons such as Linktree container, as well as in palettes for data-visualization interactors.

In addition to embedded images, XGL supports also external images. External images are located outside of the XGL document and are referenced by uniform resource locators (URLs). External image URLs can be specified using dynamic expressions, and thus can only be resolved and downloaded at runtime. External images are used in specialized controls such as ImageLoader or MediaPlayer.

10.2 Palettes: The Palettes section is used for defining color/image palettes: A palette associates colors and/or images with numeric index values. The data-visualization interactors use the color/image information in the palette for drawing their visual parts.

10.3 Translations: The Translations section defines text symbols that are used for translating the user-interface into locale-specific languages. Text symbols defined in the Translations section can be referenced in expressions using the built-in TRANSLATE function. At runtime, the text symbol will be replaced with the translated text string in the locale-specific language.

10.4 Systems: A system represents a connection to a back-end system that provides access to application data services. System declarations are used for decoupling the XGL component from the deployment-specific systems landscape. A system declaration associates a system connection with a symbolic name, known as the system alias. Infoactors are declared using system aliases rather than actual system connections. During deployment, the system aliases used in the infoactor declarations are replaced with the actual system connections, according to the deployed systems landscape.

10.5 Imports: An Import declaration instructs the XGL implementation to import an external XGL component for use by this component. All components that are nested in a WhiteBox interactor or opened in a popup relay should be imported using the Import declaration.

Part III: Execution Control

11. Actions

Actions represent user interface commands that enable the user to perform UI-related tasks and execute application services. Actions are triggered by user interface controls. When the user activates a control, the associated action is invoked, causing a prescribed response to occur.

The collection of all actions that are used in an XGL component are declared in the Actions section:

```
<xg:Controller>
    <xg:Actions>
        <xg:Action name scope disable />_{many}
    </xg:Actions>
</xg:Controller>
``` where: name=The name of the declared action; scope=The scope over which the action applies to. The scope attribute can reference either an interactor or a container. If omitted, the scope is taken to be the entire component; disable expr<bool>=Indicates whether the action is disabled. -When an action is disabled, all controls that are associated with it are disabled as well. The default value is false.

An action declaration asserts that there are one or more controls in the component that are associated with the named action and may be used to invoke it. The action declaration can also be used to dynamically enable/disable the action.

11.2 Action invocation: Many types of user interface controls can be associated with actions using the action attribute. Such controls are known as activating controls. The exact conditions that cause an activating control to invoke its associated action depend on the control's type. For example, a Button control will trigger its action when clicked. An InputField control will trigger its action when the user changes the input value and presses ENTER. A DropDown control will trigger its action when the user selects a new item from the drop-down list, and so on.

An action invocation may be written using the following syntax:

```
action-invocation: one of
    action-name
    action-name { action-parameters-list_{opt} )
    action-target : action-name
    action-target : action-name { action-parameters-list_{opt} )
action-parameters-list: one of
    action-parameter
    action-parameter , action-parameters-list
```

The action name can be any of the built-in system action names (see next section), or a user-defined action name. A system action is an action with a prescribed system response that is carried out whenever the action is invoked. A user-defined action is any action that is not a system action, and thus has no corresponding system response.

Regardless of whether the action is a system or a user-defined action, once the action has been invoked it may also trigger one or more execution plans. Action parameters can be passed in a parenthesized list following the action name. The exact number and type of parameters depends on the specific action that is invoked. Some actions support dynamic parameters that are specified using expressions. The action target is a reference to the target interactor over which the action is to be applied. If the target interactor is not specified, a default interactor is determined based on the location of the activating control in the display hierarchy:

If the activating control belongs to an interactor, then the default interactor is the containing interactor.

If the activating control belongs to a toolbar or a paging bar of a temporal container, then the default interactor is the currently visible interactor within the temporal container, if any.

In all other cases, the action has no default interactor.

The infoset of the target interactor is called the target infoset. The target infoset determines the evaluation context for action parameters that are specified using dynamic expressions.

The activating control can be enabled/disabled based on the disable condition of its associated action declaration in the Actions section. If there are multiple action declarations that match the activating control, then the disable condition on the action declaration with the smallest scope that still contains the activating control will be used. If there is also a disable condition on the control itself, then the control will be disabled when either the action's or the control's disable conditions evaluate to true.

11.3 System actions: Several system actions available in XGL are listed below. Some of the system actions are synthetic actions that are invoked automatically by the system as the result of the processing of other actions.

12. Relays

Relays represent points where execution flows and/or data flows cross XGL component boundaries. Relays are classified into inward or outward relays, depending on the direction of the flow. Relays are declared in the Relays section of an XGL document:

```
<xg:Controller>
    <xg:Relays>
        relay-decl_many
    </xg:Relays>
</xg:Controller>
relay-decl: one of
    inward-relay-decl
    outward-relay-decl
```

12.1 Inward relays: Inward relays represent points where execution or data flows enter the component from the embedding/invoking component, or from the hosting environment. Examples of inward relays available in a version of XGL include signal-in-decl, start-point-decl, timer-relay-decl, user-data-decl, data-bridge-decl, and others.

SignalIn relay (A SignalIn relay represents an incoming signal received from the embedding component.);

StartPoint relay (A StartPoint relay represents the start of the component's initialization flow.);

Timer relay (A Timer relay represents a periodic signal raised by the system clock at specified time intervals.);

UserData relay (A UserData relay represents user data provided by the hosting environment. user-data-decl);

DataBridge relay (A DataBridge relay enables a component to share an infoset with the embedding component.);

12.2 Outward relays: Outward relays represent points where execution flows and/or data flows leave the component back to the embedding/invoking component, or to the hosting environment. Examples of outward relays available in XGL include signal-out-decl, end-point-decl, goto-relay-decl, popup-relay-decl, message-relay-decl, and others.

SignalOut relay (A SignalOut relay represents an outgoing signal sent to the embedding component.);

EndPoint relay (An EndPoint relay represents the end of the component's termination flow.);

Goto relay (A GotoRelay represents a navigation flow to another component.);

Popup relay (A PopupRelay represents an invocation of another component in a popup window.);

Message relay (A Message relay represents a data message that is passed to the host environment.).

13. Execution Plans

The functional capabilities of an XGL component are captured by containers, interactors, infoactors, operators, relays, infosets, and other XGL elements. The semantics of this description is dynamically non-committing, in that it asserts that elements can be activated, that data can flow, and so on, but it does not specify what will happen, or when or where. These behavioral aspects are specified using execution plans.

An execution plan represents a single event and its prescribed chain of reactions. The collection of all execution plans in an XGL component defines its reactive behavior. Execution plans are declared in the ExecutionPlans section of the XGL document:

```
<xg:Controller>
    <xg:ExecutionPlans>
        execution-plan-decl_many
    </xg:ExecutionPlans>
</xg:Controller>
```

13.1 Execution Plan: A Plan element represents a single execution plan. The conditions that trigger the plan are defined on the Plan attributes. The sequence of execution steps that are carried out by the plan is declared in the Plan body:

```
execution-plan-decl:
    <xg:Plan id action data scope priority>
        execution-step-decl_many
    </xg:Plan>
``` where: id=The id attribute uniquely identifies the plan within the XGL component; action=(optional) The plan's action trigger; data=(Optional) The plan's data expression trigger; scope=(Optional) Limits the scope of the plan to a specific container or interactor. If scope is provided, the plan will be triggered only if the trigger originated from the specified element. Otherwise, the plan will be triggered regardless of the trigger origin; priority=(Optional) The plan's priority level, given as a numeric value. Smaller values get higher priority. The default is 1; reaction=(Optional) An action to be triggered in reaction to successful execution of this plan.

Plan triggering: An execution plan can be triggered when the action given in the action attribute is invoked, when the value of the expression given in the data attribute changes, or both. In either case, the trigger can be constrained to a particular scope of the containers hierarchy using the scope attribute. Given the above, whenever an action is invoked or a data change is detected, any number of execution plans may be triggered as a result. Therefore the execution plans need to be queued and executed in order. When the component is first initialized, an empty plans queue is created. Whenever an action and/or data event is detected, all execution plans that are triggered by the event are added to the queue, sorted by their priority attribute. Plans with a lower priority value will be placed in the queue before plans with a higher priority value. Plans with the same priority value will be placed in the queue in arbitrary order. Each execution plan in the queue is then executed in order. Each plan is completely executed in its turn, before the next plan in the queue is executed. Once all triggered plans have been completely executed, the event is said to have been run-to-completion. When the event has been run-to-completion, the component enters its next stable state and the system starts waiting for the next event trigger. If an event is detected while a previous event is in the middle of a run, the event is queued until the current event run is completed.

This model of execution ensures correct sequencing of events and their respective reactions. However, it cannot be used to guarantee real-time constraints on the event handling. Consequently, while the XGL specification is suitable for the description of interactive information systems, it is not a sufficient description for all classes of reactive systems (most notably, real-time reactive systems).

Plan execution order: The body of the Plan declaration defines the sequence of steps that need to be executed and their ordering. The plan steps are executed after the built-in system response (if any) is carried out. The plan steps are numbered sequentially using the index attribute, and are executed in according order. A plan step may depend on preceding steps in the plan, as listed in the precedents attribute. During a run-to-completion all the plan steps are visited in turn, even if some steps fail along the way. Before a step is executed, its precedents list is examined. A step will be executed only if all its precedent steps have been executed successfully. Otherwise, the step will be skipped and marked as unsuccessful. Each step is completely executed before proceeding to the next step. The step execution can be synchronous or asynchronous, depending on the step type. When the step execution completes, the step is marked with the success/failure status, and execution continues to the following steps.

Plan execution strategy: The Plan declaration defines the plan's steps, the order in which they must be executed, and the pre-conditions for their execution. However, the plan does not dictate when the plan steps should be executed. The execution timing strategy is left to the XGL implementation. The straightforward execution strategy is to simply execute the plan steps immediately, in a single run-to-completion. This is a perfectly valid strategy, and will always result in the correct execution semantics. However, this strategy might not be the most optimal way to execute the plan, since all steps are always executed—even if their execution could have been delayed to a later stage (or even never reached). If the XGL component is well-defined according to the expression determinism rules, it follows that an execution plan can be incrementally executed at different points in time, as long the ordering of the plan steps is maintained and provided that a plan step is never executed before all its preceding steps have been executed. That is, a plan can be run to completion in several runs, instead of in a single run. The first step in an execution plan always invalidates all the infosets that may be affected by any of the plan steps that follow. An optimized execution strategy can take advantage of this fact and execute the plan in a run-on-demand basis. In a run-on-demand strategy, the first run invalidates all infosets that are affected by the plan. Then, the run proceeds with the execution of the following steps in the plan, but only as long as they affect display elements that are currently visible. Plan steps that do not affect any visible display elements do not need to be executed immediately. Their execution, and the execution of the steps that precede them can be delayed to a later run, which will be initiated when their respective display elements become visible. The on-demand execution strategy can result in significant performance optimization, especially when the steps that are delayed involve expensive operations such as data service invocation or bulk data copy. However, the implementation of an on-demand strategy is also more involved, because it is harder to ensure that the execution semantics of the plan are preserved when it is split over several runs.

13.2 Execution Steps: Examples of execution plan steps available in XGL include invalidation-step-decl, copying-step-dec, mapping-step-decl, evaluation-step-decl, transition-step-decl, and others.

Invalidation step (An Invalidate step clears and invalidates a given list of infosets.);

Copying step (A Copy step performs a data copy from a source infoset to a target infoset.);

Mapping step (A Map step performs a data mapping from a source infoset to a target infoset.);

Evaluation step (An Eval step re-evaluates an actor after its underlying infoset(s) have changed);

Transition step (A Trans step performs a visibility transition from a source element to a target element under a temporal container).

Processing System

Figure 8:
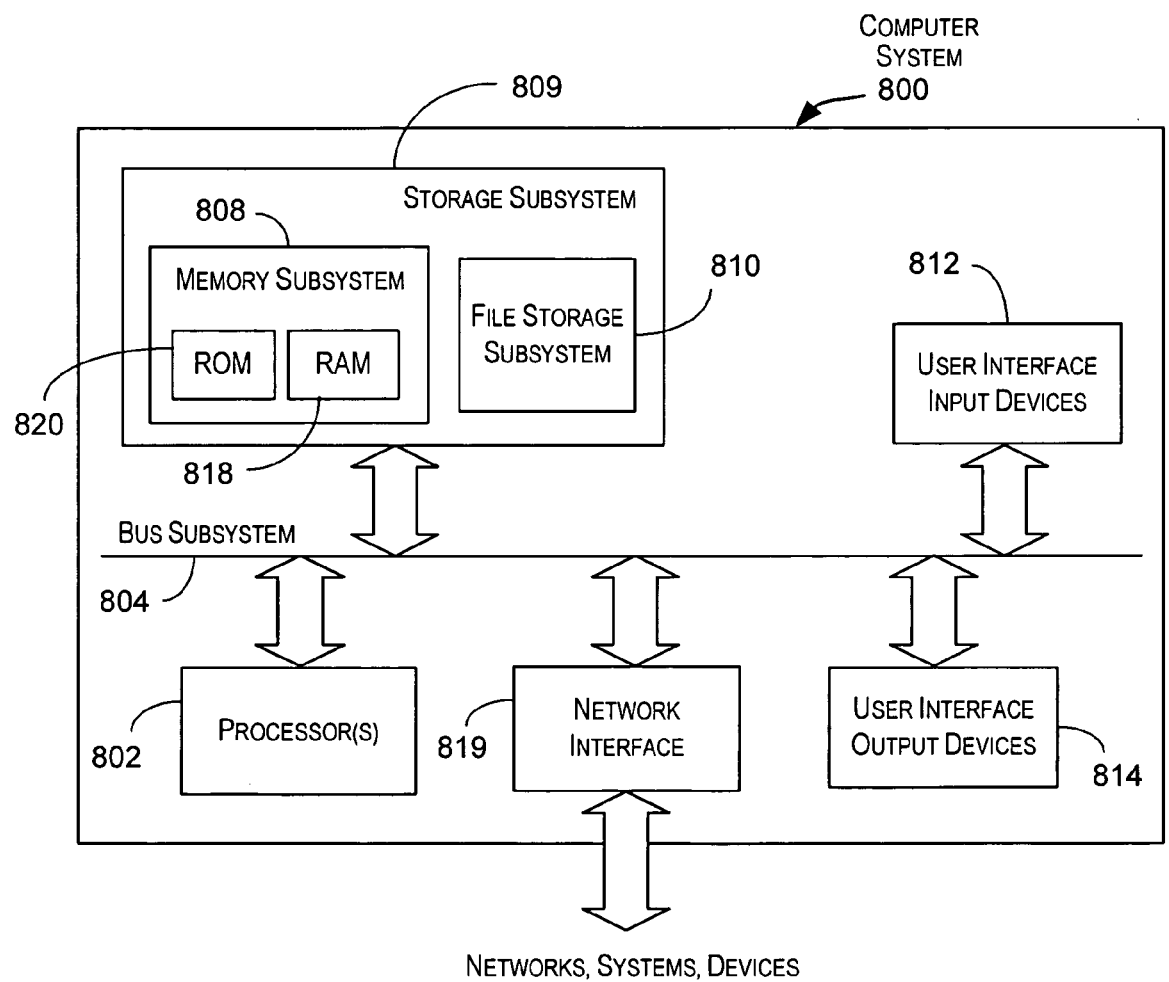
FIG. 8 is a simplified block diagram of a computer system that may be used to perform processing according to an embodiment of the present invention.

FIG. 8 is a simplified block diagram of a computer system 800 that may be used to perform processing according to an embodiment of the present invention. As shown in FIG. 8, computer system 800 includes a processor or processing engine 802 that communicates with a number of peripheral devices via a bus subsystem 804. These peripheral devices may include a storage subsystem 806, comprising a memory subsystem 808 and a file storage subsystem 810, user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem may utilize multiple busses.

Network interface subsystem 816 provides an interface to other computer systems, networks, and devices. Network interface subsystem 816 serves as an interface for receiving data from and transmitting data to other systems, networks, devices, etc. from computer system 800.

User interface input devices 812 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 800. A user may use an input device to interact with design modeling tools to create a model representation for a GUI application.

User interface output devices 814 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 800. An output device may be used to output a GUI to the user.

Storage subsystem 806 may be configured to store the basic programming and data constructs that provide the functionality of the present invention. Software (code modules or instructions) that provides the functionality of the present invention may be stored in storage subsystem 806. These software modules or instructions may be executed by processor(s) 802. Storage subsystem 806 may also provide a repository for storing data used in accordance with the present invention. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 800 can be of various types including a personal computer, a portable computer, a desktop, a workstation, a network computer, a mainframe, a kiosk, or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer components than the system depicted in FIG. 8 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. For example, description has been provided with regards to various runtime environments such as Java runtime platform, HTML runtime platform, Flash runtime platform, etc. These examples are not intended to limit the scope of the present invention. The teachings of the present invention may also be applied to other runtime environment platforms. As another example, a specific XGL specification is described above and in Appendix G of U.S. Provisional Patent Application No. 60/722,888 filed Sep. 30, 2005. Other XGL specifications may also be provided in accordance with the present invention. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a computer system, the method comprising:
receiving from a modeling tool information defining a model representation for an application, the model representation comprising graphical user interface (GUI) components and dependencies between GUI components to define a GUI for the application;
selecting and using a first set of mapping rules to automatically generate a declarative and executable abstract representation for the GUI based upon the model representation, including the GUI components and the dependencies between GUI components, wherein the abstract representation is independent of a runtime environment platform for executing the application and said selecting is performed based at least in part on a model type associated with the model representation;
using a second set of mapping rules to automatically generate a first GUI for a first runtime environment platform using the abstract representation; and
using a third set of mapping rules to automatically generate a second GUI from the abstract representation.

2. The method of claim 1 wherein generating the first GUI comprises:
generating first source code based upon the abstract representation, wherein the first source code is in a language supported by the first runtime environment platform; and
executing the first source code using the first runtime environment platform to generate the first GUI.

3. The method of claim 1 wherein generating the first GUI comprises:
generating machine executable statements specific to the first runtime environment platform based upon the abstract representation; and
executing the machine executable statements using the first runtime environment platform to generate the first GUI.

4. The method of claim 1 wherein the first runtime environment platform is at least one of a Java platform, a Flash platform, Extensible Application Markup Language (XAML) platform, or a dynamic HTML (DHTML) platform.

5. The method of claim 1 wherein the abstract representation is not dependent on a GUI-framework of the runtime environment platform.

6. The method of claim 1 wherein the abstract representation is not dependent on a language of the runtime environment platform.

7. A system, the system comprising:
a memory storing a model representation for an application, the model representation comprising graphical user interface (GUI) components and dependencies between GUI components to define a GUI for the application; and
a processor coupled to the memory, wherein the processor is configured to:
select and use a first set of mapping rules to automatically generate a declarative and executable abstract representation for the GUI based upon the model representation, including the GUI components and dependencies between GUI components, wherein the abstract representation is independent of a runtime environment platform for executing the application and said selection is performed based at least in part on a model type associated with the model representation,
use a second set of mapping rules to automatically generate a first GUI for a first runtime environment platform using the abstract representation, and
use a third set of mapping rules to automatically generate a second GUI from the abstract representation.

8. The system of claim 7 wherein the processor is configured to generate the first GUI by:
generating first source code based upon the abstract representation, wherein the first source code is in a language supported by the first runtime environment platform; and executing the first source code using the first runtime environment platform to generate the first GUI.

9. The system of claim 7 wherein the processor is configured to generate the first GUI by:
generating machine executable statements specific to the first runtime environment platform based upon the abstract representation; and executing the machine executable statements using the first runtime environment platform to generate the first GUI.

10. The system of claim 7 wherein the first runtime environment platform is at least one of a Java platform, a Flash platform, Extensible Application Markup Language (XAML), or a dynamic HTML (DHTML) platform.

11. The system of claim 7 wherein the abstract representation is not dependent on a GUI-framework of the runtime environment platform.

12. The system of claim 7 wherein the abstract representation is not dependent on a language of the runtime environment platform.

13. A non-transitory, computer-readable medium storing a plurality of instructions for controlling a data processor, the plurality of instructions comprising:
instructions that cause the data processor to receive from a modeling tool information defining a model representation for an application, the model representation comprising graphical user interface (GUI) components and dependencies between GUI components to define a GUI for the application;
instructions that cause the data processor to select and use a first set of mapping rules to automatically generate a declarative and executable abstract representation for the GUI based upon the model representation, including the GUI components and the dependencies between GUI components, wherein the abstract representation is independent of a runtime environment platform for executing the application and said selection is performed based at least in part on a model type associated with the model representation;
instructions that cause the data processor to use a second set of mapping rules to automatically generate a first GUI for a first runtime environment platform using the abstract representation; and
instructions that cause the data processor to use a third set mapping rules to automatically generate a second GUI from the abstract representation.

14. The computer-readable medium of claim 13, wherein the
second GUI is for a second runtime environment platform different from the first runtime environment platform, and further wherein at least a portion of the second GUI is rendered differently, using a different graphical element, than a corresponding portion of the first GUI.

15. The computer-readable medium of claim 13, wherein generating the first GUI comprises:
generating first source code based upon the abstract representation, wherein the first source code is in a language supported by the first runtime environment platform; and
executing the first source code using the first runtime environment platform to generate the first GUI.

16. The computer-readable medium of claim 13, wherein generating the first GUI comprises:
generating machine executable statements specific to the first runtime environment platform based upon the abstract representation; and
executing the machine executable statements using the first runtime environment platform to generate the first GUI.

17. The computer-readable medium of claim 13, wherein the first runtime environment platform is at least one of a Java platform, a Flash platform, Extensible Application Markup Language (XAML) platform, or a dynamic HTML (DHTML) platform.

18. The computer-readable medium of claim 13, wherein the abstract representation is not dependent on a GUI-framework of the runtime environment platform.

19. The computer-readable medium of claim 13, wherein the abstract representation is not dependent on a language of the runtime environment platform.

* * * * *